United States Patent
Kishi et al.

(10) Patent No.: US 10,824,157 B2
(45) Date of Patent: *Nov. 3, 2020

(54) VEHICLE CONTROL APPARATUS

(71) Applicant: Honda Motor Co., Ltd., Tokyo (JP)

(72) Inventors: Takayuki Kishi, Wako (JP); Toshiyuki Mizuno, Wako (JP); Yoshiaki Konishi, Wako (JP); Akira Kito, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 191 days.

This patent is subject to a terminal disclaimer.

(21) Appl. No.: 16/175,720

(22) Filed: Oct. 30, 2018

(65) Prior Publication Data

US 2019/0129439 A1 May 2, 2019

(30) Foreign Application Priority Data

Nov. 2, 2017 (JP) .................... 2017-212699

(51) Int. Cl.
*G05D 1/02* (2020.01)
*G05D 1/00* (2006.01)
*B60W 10/06* (2006.01)
*B60W 10/11* (2012.01)
*B60W 30/14* (2006.01)

(52) U.S. Cl.
CPC .......... *G05D 1/0223* (2013.01); *B60W 10/06* (2013.01); *B60W 10/11* (2013.01); *B60W 30/143* (2013.01); *G05D 1/0088* (2013.01); *B60W 2710/0605* (2013.01);
(Continued)

(58) Field of Classification Search
CPC ................. B60W 10/06; B60W 10/11; B60W 2710/0605; B60W 2710/1005; B60W 2720/10; B60W 2720/103; B60W 2720/106; B60W 30/10; B60W 30/143; B60W 30/16; B60W 60/0013; G05D 1/0088; G05D 1/0223
See application file for complete search history.

(56) References Cited

U.S. PATENT DOCUMENTS 8,301,343 B2 * 10/2012 Tanimoto ............... B60T 7/12
180/271
9,914,458 B2 * 3/2018 Sato ..................... G05D 1/0212
(Continued)

FOREIGN PATENT DOCUMENTS

EP 3048021 A1 * 7/2016 .......... B60W 30/095
JP 2017013749 A 1/2017

*Primary Examiner* — Babar Sarwar
(74) *Attorney, Agent, or Firm* — Duft & Bornsen, PC

(57) ABSTRACT

A vehicle control apparatus including an electric control unit including a microprocessor and a memory connected to the microprocessor. The microprocessor is configured to generate an action plan of the self-driving vehicle and control a drive power source and a transmission so that a self-driving vehicle travels by self-driving in accordance with the action plan. The action plan includes a target vehicle speed after continuously increasing or decreasing beyond a unit time and a target time from a present time to a time when the target vehicle speed is achieved, and the microprocessor is configured to control the drive power source and the transmission so that the self-driving vehicle travels at a target vehicle acceleration set based on the target time and a vehicle speed change amount from the vehicle speed at the present time to the target vehicle speed.

18 Claims, 16 Drawing Sheets

(52) U.S. Cl.
CPC . *B60W 2710/1005* (2013.01); *B60W 2720/10* (2013.01); *B60W 2720/106* (2013.01)

(56) References Cited

U.S. PATENT DOCUMENTS

| | | | | |
|---|---|---|---|---|
| 10,501,078 | B2* | 12/2019 | Kishi | B60W 40/1005 |
| 2016/0209843 | A1* | 7/2016 | Meuleau | G01C 21/3407 |
| 2016/0311431 | A1* | 10/2016 | Kato | B60W 30/095 |
| 2017/0008522 | A1* | 1/2017 | Sato | B60W 30/095 |
| 2017/0192431 | A1* | 7/2017 | Foster | G05D 1/0088 |
| 2018/0188734 | A1* | 7/2018 | Zhu | G05D 1/0212 |
| 2020/0172123 | A1* | 6/2020 | Kubota | B60W 50/14 |

* cited by examiner

VEHICLE CONTROL APPARATUS

CROSS-REFERENCE TO RELATED APPLICATION

This application is based upon and claims the benefit of priority from Japanese Patent Application No. 2017-212699 filed on Nov. 2, 2017, the content of which is incorporated herein by reference.

BACKGROUND OF THE INVENTION

Field of the Invention

This invention relates to a vehicle control apparatus for controlling a vehicle having a self-driving capability.

Description of the Related Art

Conventionally, there is a known apparatus of this type, configured to utilize a subject vehicle's surroundings information and map information to generate a travel route of the subject vehicle by sequentially connecting multiple point data of unit times including vehicle position data and vehicle speed data and to perform vehicle control for self-driving the subject vehicle along the travel route. Such an apparatus is described in Japanese Unexamined Patent Publication No. 2017-13749 (JP2017-013749A), for example. In the apparatus described in JP2017-013749A, acceleration during every unit time is calculated from vehicle speed change during the unit time and throttle valve opening and transmission speed ratio are controlled to obtain the required driving torque based on the acceleration.

However, in the apparatus according to JP2017-013749A, vehicle traveling is controlled based on target acceleration at every unit time on the travel route, i.e., based on moment-to-moment target acceleration. Therefore, smooth acceleration of the vehicle is hard to achieve, and thus ride comfort of the self-driving vehicle is adversely affected.

SUMMARY OF THE INVENTION

An aspect of the present invention is a vehicle control apparatus for controlling a self-driving vehicle with a self-drive function including a drive power source, drive wheels, and a transmission installed in a power transmission path from the drive power source to the drive wheels, including: an electric control unit including a microprocessor and a memory connected to the microprocessor. The microprocessor is configured to perform: generating an action plan of the self-driving vehicle, the action plan including target position data of the self-driving vehicle set every a unit time within a predetermined time period of a present time; and controlling the drive power source and the transmission so that the self-driving vehicle travels by self-driving in accordance with the action plan generated. The action plan includes a target vehicle speed defined as a vehicle speed after continuously increasing or decreasing beyond the unit time and a target time defined as a time period from the present time to a time when the target vehicle speed is achieved, and the controlling includes controlling the drive power source and the transmission so that the self-driving vehicle travels at a target vehicle acceleration set based on the target time and a vehicle speed change amount from the vehicle speed at the present time to the target vehicle speed.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
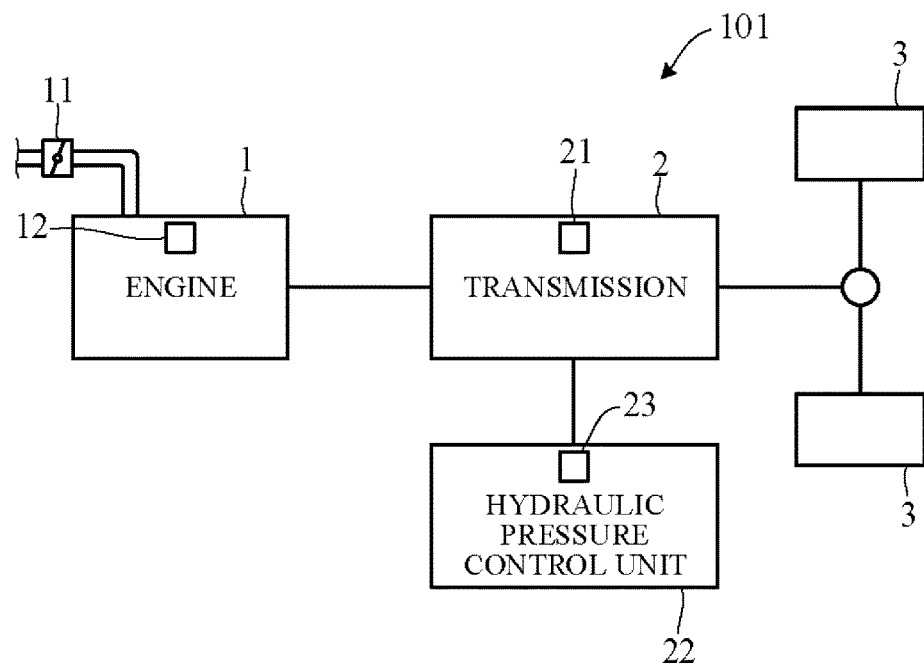
FIG. 1 is a diagram showing a configuration overview of a driving system of a self-driving vehicle incorporating a vehicle control apparatus according to an embodiment of the present invention.

Hereinafter, an embodiment of the present invention is explained with reference to FIGS. 1 to 20. A vehicle control apparatus according to an embodiment of the present invention is applied to a vehicle (self-driving vehicle) having a self-driving capability. FIG. 1 is a diagram showing a configuration overview of a driving system of a self-driving vehicle 101 incorporating a vehicle control apparatus according to the present embodiment. Herein, the self-driving vehicle may be sometimes called "subject vehicle" to differentiate it from other vehicles. The vehicle 101 is not limited to driving in a self-drive mode requiring no driver driving operations but is also capable of driving in a manual drive mode by driver operations.

As shown in FIG. 1, the vehicle 101 includes an engine 1 and a transmission 2. The engine 1 is an internal combustion engine (e.g., gasoline engine) wherein intake air supplied through a throttle valve 11 and fuel injected from an injector 12 are mixed at an appropriate ratio and thereafter ignited by a sparkplug or the like to burn explosively and thereby generate rotational power. A diesel engine or any of various other types of engine can be used instead of a gasoline engine. Air intake volume is metered by the throttle valve 11.

The transmission 2, which is installed in a power transmission path between the engine 1 and drive wheels 3, varies speed ratio of rotation of from the engine 1, and converts and outputs torque from the engine 1. The rotation of speed converted by the transmission 2 is transmitted to the drive wheels 3, thereby propelling the vehicle 101. Optionally, the vehicle 101 can be configured as an electric vehicle or hybrid vehicle by providing a drive motor as a drive power source in place of or in addition to the engine 1.

The transmission 2 is, for example, a stepped transmission enabling stepwise speed ratio (gear ratio) shifting in accordance with multiple (e.g. six) speed stages. Optionally, a continuously variable transmission enabling stepless speed ratio shifting can be used as the transmission 2. Although omitted in the drawings, power from the engine 1 can be input to the transmission 2 through a torque converter. The transmission 2 can, for example, incorporate a dog clutch, friction clutch or other engaging element 21. A hydraulic pressure control unit 22 can shift speed stage of the transmission 2 by controlling flow of oil to the engaging element 21. The hydraulic pressure control unit 22 includes a solenoid valve or other valve mechanism operated by electric signals (called "shift actuator 23" for sake of convenience), and an appropriate speed stage can be implemented by changing flow of hydraulic pressure to the engaging element 21 in response to operation of the shift actuator 23.

Figure 2:
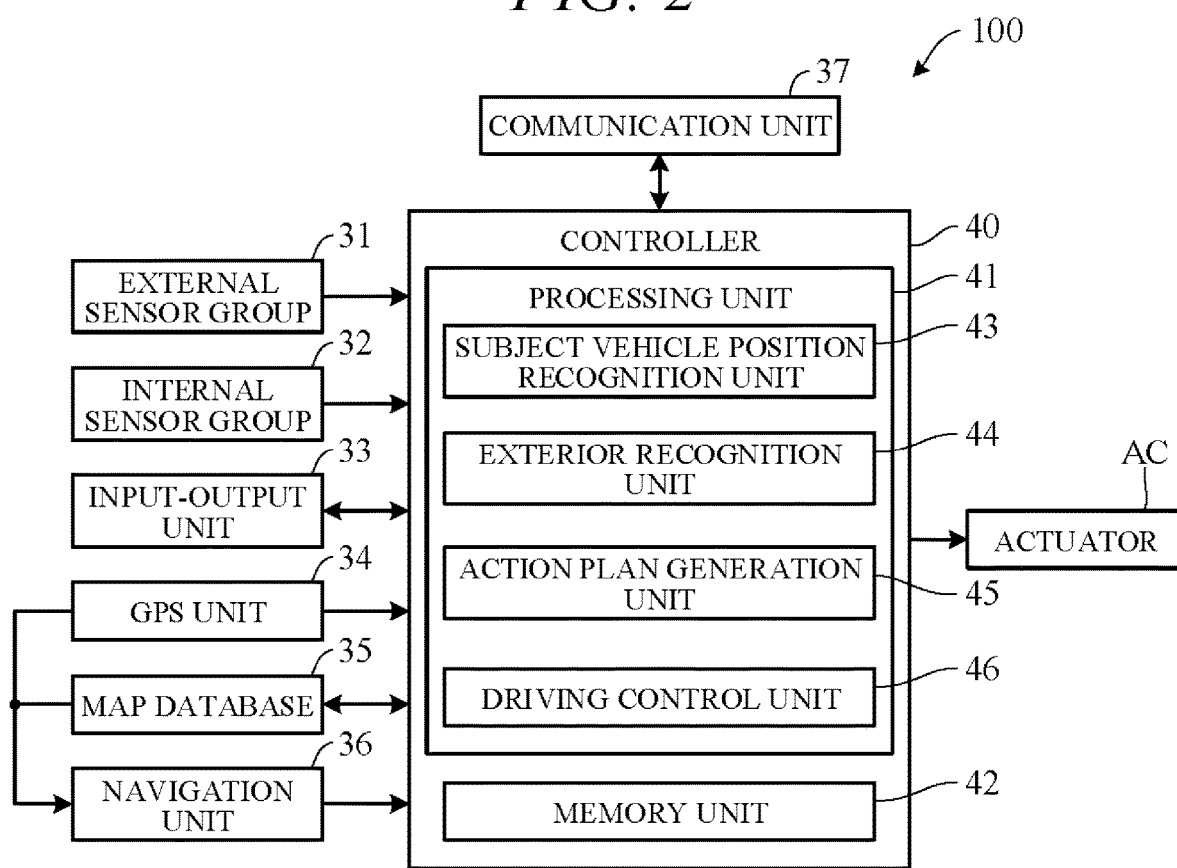
FIG. 2 is a block diagram schematically illustrating overall configuration of a vehicle control apparatus according to an embodiment of the present invention.

FIG. 2 is a block diagram schematically illustrating overall configuration of a vehicle control apparatus (vehicle control system) 100 according to an embodiment of the present invention. As shown in FIG. 2, the vehicle control apparatus 100 is configured centered on a controller 40 and includes mainly of the controller 40, and as members electrically connected thereto through CAN (Controller Area Network) communication or the like, an external sensor group 31, an internal sensor group 32, an input-output unit 33, a GPS unit 34, a map database 35, a navigation unit 36, a communication unit 37, and actuators AC.

The term external sensor group 31 herein is a collective designation encompassing multiple sensors (external sensors) for detecting external circumstances constituting subject vehicle ambience data. For example, the external sensor group 31 includes, inter alia, a LIDAR (Light Detection and Ranging) for measuring distance from the vehicle to ambient obstacles by measuring scattered light produced by laser light radiated from the subject vehicle in every direction, a CCD, CMOS or other image sensor-equipped on-board cameras for imaging subject vehicle ambience (forward, reward and sideways), and a RADAR (Radio Detection and Ranging) for detecting other vehicles and obstacles around the subject vehicle by radiating electromagnetic waves and detecting reflected waves.

The term internal sensor group 32 herein is a collective designation encompassing multiple sensors (internal sensors) for detecting subject vehicle driving state. For example, the internal sensor group 32 includes, inter alia, an engine speed sensor for detecting engine rotational speed, a vehicle speed sensor for detecting subject vehicle running speed, acceleration sensors for detecting subject vehicle forward-rearward direction acceleration and lateral acceleration, respectively, and a yaw rate sensor for detecting rotation angle speed around a vertical axis through subject vehicle center of gravity. The internal sensor group 32 also includes sensors for detecting driver driving operations in manual drive mode, including, for example, accelerator pedal operations, brake pedal operations, steering wheel operations and the like.

The term input-output unit 33 is used herein as a collective designation encompassing apparatuses receiving instructions input by the driver and outputting information to the driver. For example, the input-output unit 33 includes, inter alia, switches which the driver uses to input various instructions by operating operation members, a microphone which the driver uses to input voice instructions, a display for presenting information to the driver via displayed images, and a speaker for presenting information to the driver by voice. The switches include a mode select switch for instructing either self-drive mode or manual drive mode.

The GPS unit 34 includes a GPS receiver for receiving position determination signals from multiple GPS satellites, and measures absolute position (latitude, longitude and the like) of the subject vehicle based on the signals received from the GPS receiver.

The map database 35 is a unit storing general map data used by the navigation unit 36 and is, for example, implemented using a hard disk. The map data include road position data and road shape (curvature etc.) data, along with intersection and road branch position data. The map data stored in the map database 35 are different from high-accuracy map data stored in a memory unit 42 of the controller 40.

The navigation unit 36 retrieves target road routes to destinations input by the driver and performs guidance along selected target routes. Destination input and target route guidance is performed through the input-output unit 33. Target routes are computed based on subject vehicle current position measured by the GPS unit 34 and map data stored in the map database 35.

The communication unit 37 communicates through networks including the Internet and other wireless communication networks to access servers (not shown in the drawings) to acquire map data, traffic data and the like, periodically or at arbitrary times. Acquired map data are output to the map database 35 and/or memory unit 42 to update their stored map data. Acquired traffic data include congestion data and traffic light data including, for instance, time to change from red light to green light.

The actuators AC are provided to perform driving of the vehicle 101. The actuators AC include a throttle actuator for adjusting opening angle of the throttle valve 11 of the engine 1 (throttle opening angle), a shift actuator 23 for changing speed stage of the transmission 2, a brake actuator for operating a braking unit, and a steering actuator for driving a steering unit.

The controller 40 is constituted by an electronic control unit (ECU). Optionally, the controller 40 can be integrally configured by consolidating multiple function-differentiated ECUs such as an engine control ECU, a transmission control ECU and so on. The controller 40 incorporates a computer including a CPU or other processing unit (a microprocessor) 41, the memory unit (a memory) 42 of RAM, ROM, hard disk and the like, and other peripheral circuits not shown in the drawings.

The memory unit 42 stores high-accuracy detailed map data including, inter alia, lane center position data and lane boundary line data. More specifically, road data, traffic regulation data, address data, facility data, telephone number data and the like are stored as map data. The road data include data identifying roads by type such as expressway, toll road and national highway, and data on, inter alia, number of road lanes, individual lane width, road gradient, road 3D coordinate position, lane curvature, lane merge and branch point positions, and road signs. The traffic regulation data include, inter alia, data on lanes subject to traffic restriction or closure owing to construction work and the like. The memory unit 42 also stores a shift map (shift chart) serving as a shift operation reference.

As functional configurations, the processing unit 41 includes a subject vehicle position recognition unit 43, an exterior recognition unit 44, an action plan generation unit 45, and a driving control unit 46.

The subject vehicle position recognition unit 43 recognizes map position of the subject vehicle (subject vehicle position) based on subject vehicle position data calculated by the GPS unit 34 and map data stored in the map database 35. Optionally, the subject vehicle position can be recognized using map data (building shape data and the like) stored in the memory unit 42 and ambience data of the vehicle 101 detected by the external sensor group 31, whereby the subject vehicle position can be recognized with high accuracy. Optionally, when the subject vehicle position can be measured by sensors installed externally on the road or by the roadside, the subject vehicle position can be recognized with high accuracy by communicating with such sensors through the communication unit 37.

The exterior recognition unit 44 recognizes external circumstances around the subject vehicle based on signals from cameras, LIDERs, RADARs and the like of the external sensor group 31. For example, it recognizes position, speed and acceleration of nearby vehicles driving in the vicinity of the subject vehicle, position of vehicles stopped or parked in the vicinity of the subject vehicle, and position and state of other objects. Other objects include traffic signs, traffic lights, road boundary and stop lines, buildings, guardrails, power poles, commercial signs, pedestrians, bicycles, and the like. Recognized states of other objects include, for example, traffic light color (red, green or yellow) and moving speed and direction of pedestrians and bicycles.

The action plan generation unit 45 generates a subject vehicle driving path (target path) from present time point to a certain time ahead based on, for example, a target route computed by the navigation unit 36, subject vehicle position recognized by the subject vehicle position recognition unit 43, and external circumstances recognized by the exterior recognition unit 44. When multiple paths are available on the target route as target path candidates, the action plan generation unit 45 selects from among them the path that optimally satisfies legal compliance, safe efficient driving and other criteria, and defines the selected path as the target path. The action plan generation unit 45 then generates an action plan matched to the generated target path. An action plan is also called "travel plan".

The action plan includes action plan data set for every unit time $\Delta t$ (e.g., 0.1 sec) between present time point and a predetermined time period T1 (e.g., 5 sec) ahead, i.e., includes action plan data set in association with every unit time $\Delta t$ interval. The action plan data include subject vehicle position data and vehicle state data for every unit time $\Delta t$. The position data are, for example, data indicating 2D coordinate position on road, and the vehicle state data are vehicle speed data indicating vehicle speed, direction data indicating subject vehicle direction, and the like. The vehicle state data can be determined from position data change of successive unit times $\Delta t$. Action plan is updated every unit time $\Delta t$.

Figure 3:
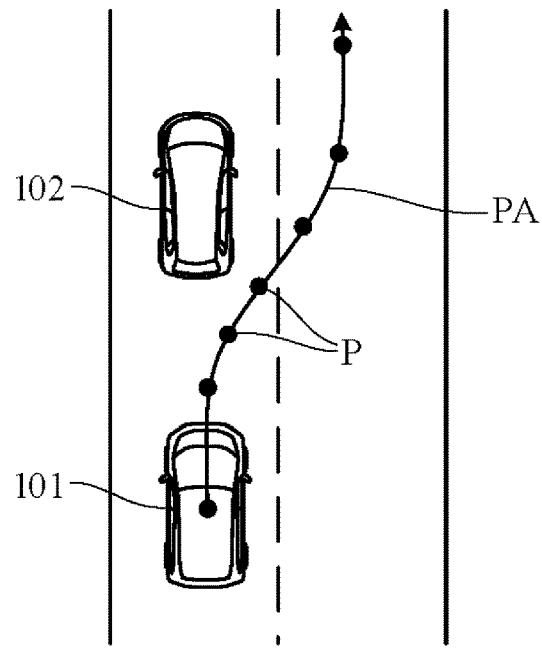
FIG. 3 is a diagram showing an example of an action plan generated by an action plan generation unit of FIG. 2.

FIG. 3 is a diagram showing an action plan generated by the action plan generation unit 45. FIG. 3 shows a scene depicting an action plan for the subject vehicle 101 when changing lanes and overtaking a preceding vehicle 102 (forward vehicle). Points P in FIG. 3 correspond to position data at every unit time $\Delta t$ between present time point and predetermined time period T1 ahead. A target path PA is obtained by connecting the points P in time order.

In self-drive mode, the driving control unit 46 controls the actuators AC to drive the subject vehicle 101 along target path PA generated by the action plan generation unit 45. Specifically, it controls the throttle actuator, shift actuator 23, brake actuator and steering actuator so as to drive the subject vehicle 101 through the points P of the unit times $\Delta t$ in FIG. 3. In manual drive mode, the driving control unit 46 controls the actuators AC in accordance with driving instructions by the driver (accelerator opening angle and the like) acquired from the internal sensor group 32.

In relation to controlling of the shift actuator 23, the driving control unit 46 calculates a target acceleration of the subject vehicle 101 based on data representing a vehicle speed change included in the action plan generated by the action plan generation unit 45. In addition, the driving control unit 46 calculates required driving force for achieving the target accelerations taking running resistance caused by road gradient and the like into account. Further, the driving control unit 46 controls shift operation of the transmission 2 by outputting control signals to the shift actuator 23 using a shift map stored in the memory unit 42 in advance to serve as a shift operation reference. The acceleration becomes a positive value in acceleration, and becomes a negative value in deceleration.

Figure 4:
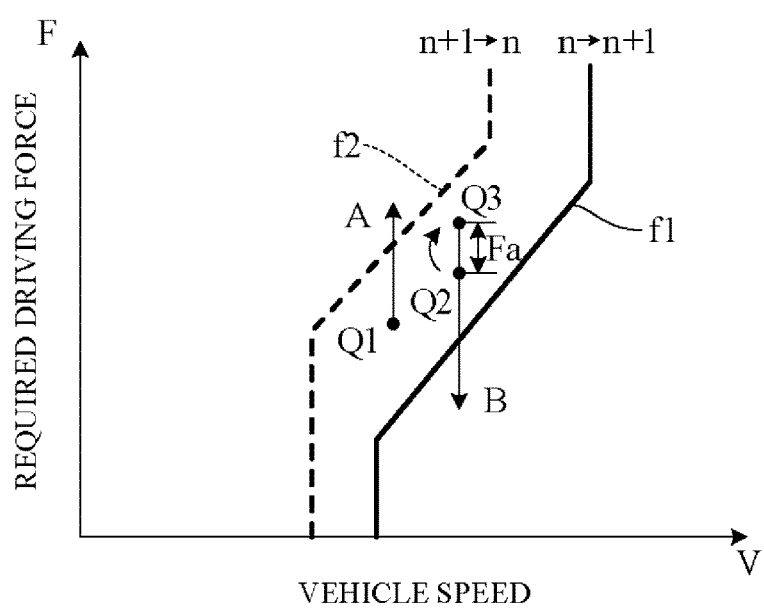
FIG. 4 is a diagram showing an example of a shift map as a reference of a shift operation.

FIG. 4 is a diagram showing an example of the shift map stored in the memory unit 42. In the drawing, horizontal axis is scaled for vehicle speed V and vertical axis for required driving force F. Required driving force F is in one-to-one correspondence to accelerator opening angle (in self-drive mode, simulated accelerator opening angle) or throttle opening angle, and required driving force F increases with increasing accelerator opening angle or throttle opening angle. Therefore, the vertical axis can instead be scaled for accelerator opening angle or throttle opening angle. Characteristic curve (solid line) f1 is an example of an upshift curve corresponding to upshift from n stage to n+1 stage and characteristic curve f2 (dashed line) is an example of a downshift curve corresponding to downshift from n+1 stage to n stage.

For example, considering downshift from operating point Q1 as shown in FIG. 4, in a case where required driving force F increases under constant vehicle speed V, the transmission 2 downshifts from n+1 stage to n stage when operating point Q1 crosses downshift curve f2 (arrow A). On the other hand, looking for example at upshift from operating point Q2, in a case where required driving force F decreases under constant vehicle speed V, the transmission 2 upshifts from n stage to n+1 stage when operating point Q3, obtained by adding predetermined excess driving force Fa to required driving force F at operating point Q2, crosses upshift curve f1 (arrow B).

In other words, as regards upshift, upshift tendency of the transmission 2 is restrained by raising apparent required driving force F by excess driving force Fa. As a result, busy shifting condition marked by frequent downshifting and upshifting, so called shift hunting, can be avoided. Excess driving force Fa can be either a fixed value or a variable value with vehicle speed or required driving force as a parameter.

In the so-configured vehicle control apparatus 100, the driving control unit 46 utilizes vehicle speed (target vehicle speed) at points P of sequential unit times Δt on target path PA (FIG. 3) to calculate acceleration (target acceleration) and required driving force of sequential unit times Δt. And the actuators AC are feedback controlled to bring actual acceleration detected by the internal sensor group 32, for example, into coincidence with target acceleration. In this case, however, during acceleration, transition from acceleration to cruising, and cornering or the like, issues like the following are apt to arise.

Figure 5:
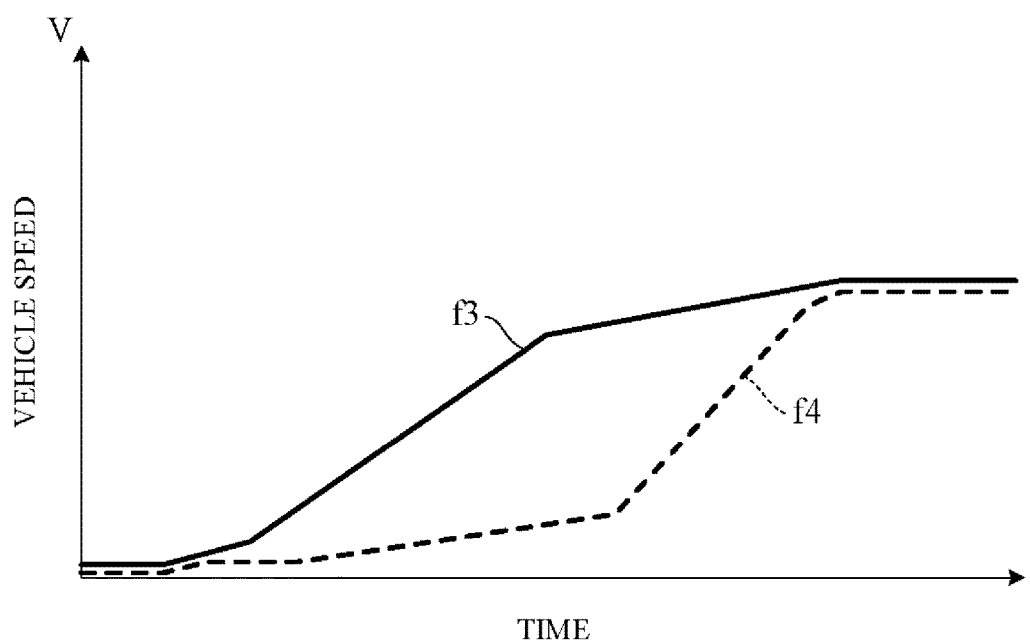
FIG. 5 is a time chart for explaining a problem arising during acceleration.

A problem occurring during acceleration is taken up first. FIG. 5 is a time chart showing an example of vehicle speed V change during acceleration. Characteristic curve f3 (solid curve) in the drawing is a target vehicle speed curve according to an action plan, and characteristic curve f4 (dashed line curve) is an actual vehicle speed curve. When vehicle acceleration is controlled based on required driving force of every unit time Δt, the transmission 2 is downshifted once the required driving force of any unit time Δt rises, in accordance with that required driving force, whereby the vehicle accelerates. In other words, the transmission 2 is downshifted not with consideration to an overall action plan within predetermined time period T1 but in response to momentary action plans of individual unit times Δt. As a result, as shown in FIG. 5, when target vehicle speed increases with increasing vehicle acceleration, smooth acceleration becomes difficult because vehicle speed increase lags behind target vehicle speed increase. Moreover, busy shifting is apt to occur owing to required driving force overshoot caused by the vehicle speed increase lag. An attempt to prevent busy shifting by downshifting the transmission 2 stage by stage aggravates vehicle speed lag.

Figure 6:
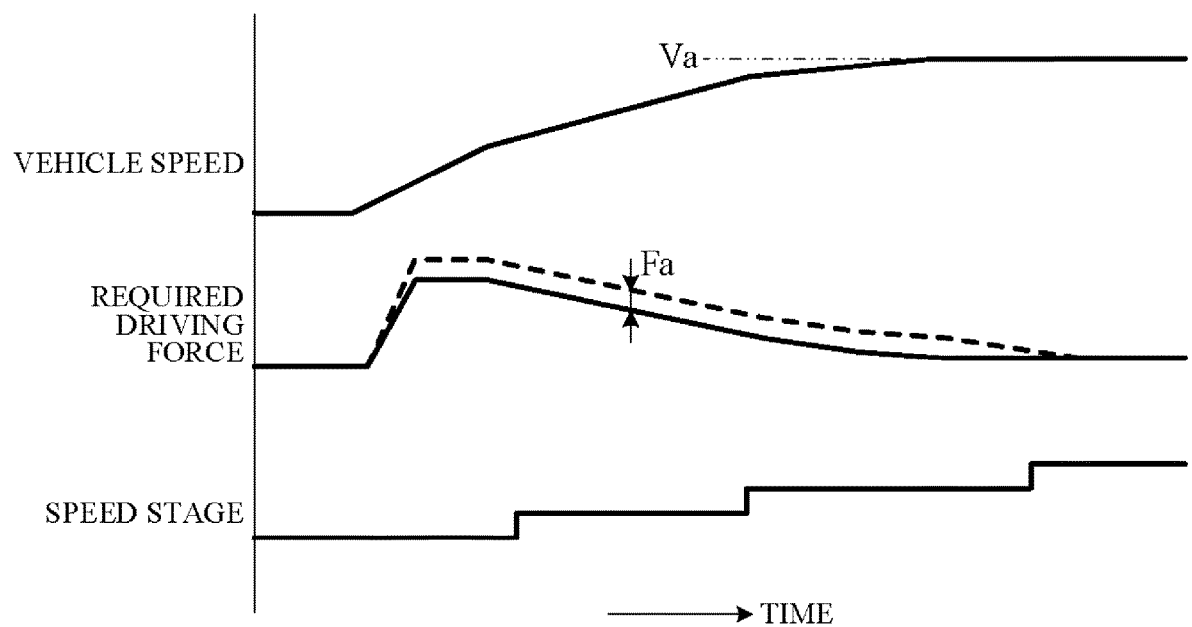
FIG. 6 is a time chart for explaining a problem arising during transition from acceleration to cruising.

A problem arising during transition from acceleration to cruising is explained next. FIG. 6 is a time chart showing an example of change in target vehicle speed, required driving force and speed stage during transition from acceleration to cruising (at set vehicle speed Va). As shown in FIG. 6, required driving force gradually declines during transition to cruising, so that the transmission 2 is upshifted. Since excess driving force Fa is added to the required driving force at this time (see FIG. 4), upshifting is delayed. Therefore, engine speed stays high regardless of the transition from acceleration to moderate acceleration, and fuel economy and noise level are adversely affected.

Figure 7:
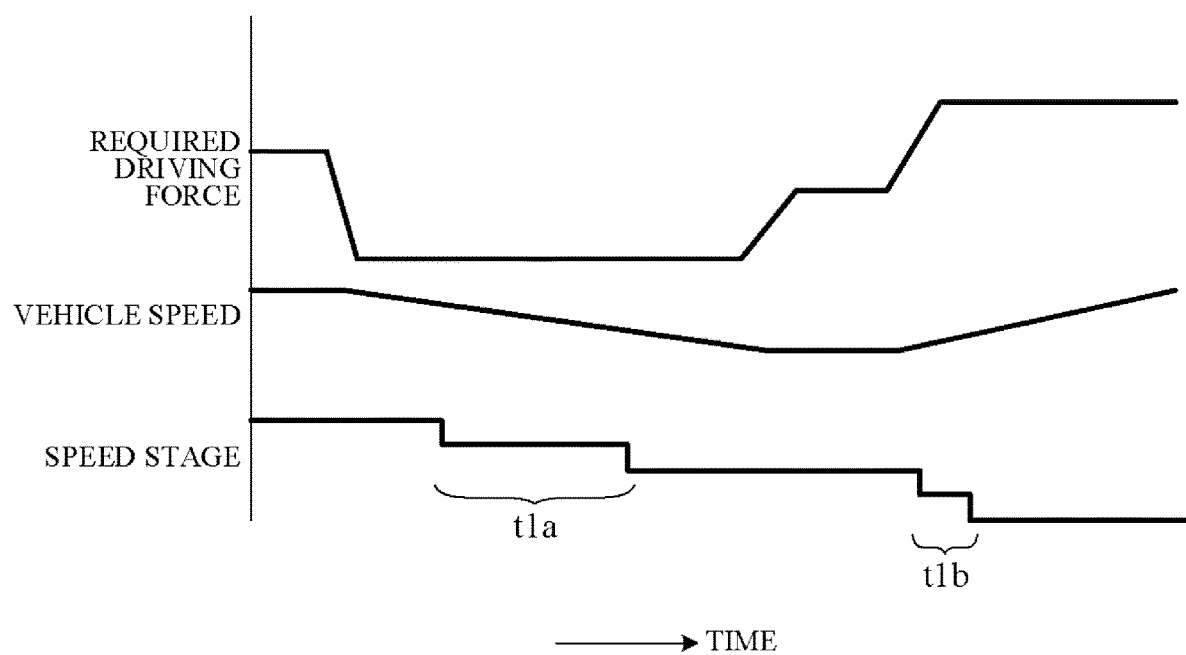
FIG. 7 is a time chart for explaining a problem arising during cornering.

A problem arising during cornering is discussed next. The vehicle decelerates during cornering and reaccelerates after cornering is completed. FIG. 7 is a time chart showing an example of change in required driving force, vehicle speed, and speed stage during cornering. As shown in FIG. 7, since required driving force and vehicle speed decrease as the subject vehicle approaches a curve, the transmission 2 is downshifted accordingly (time period t1a). During reacceleration after cornering, required driving force increases, so that the transmission 2 is downshifted and speed increases (time period t1b). With downshifting performed in response to required driving force of every unit time Δt at this time, acceleration is delayed and smooth cornering is hard to achieve.

Figure 8:
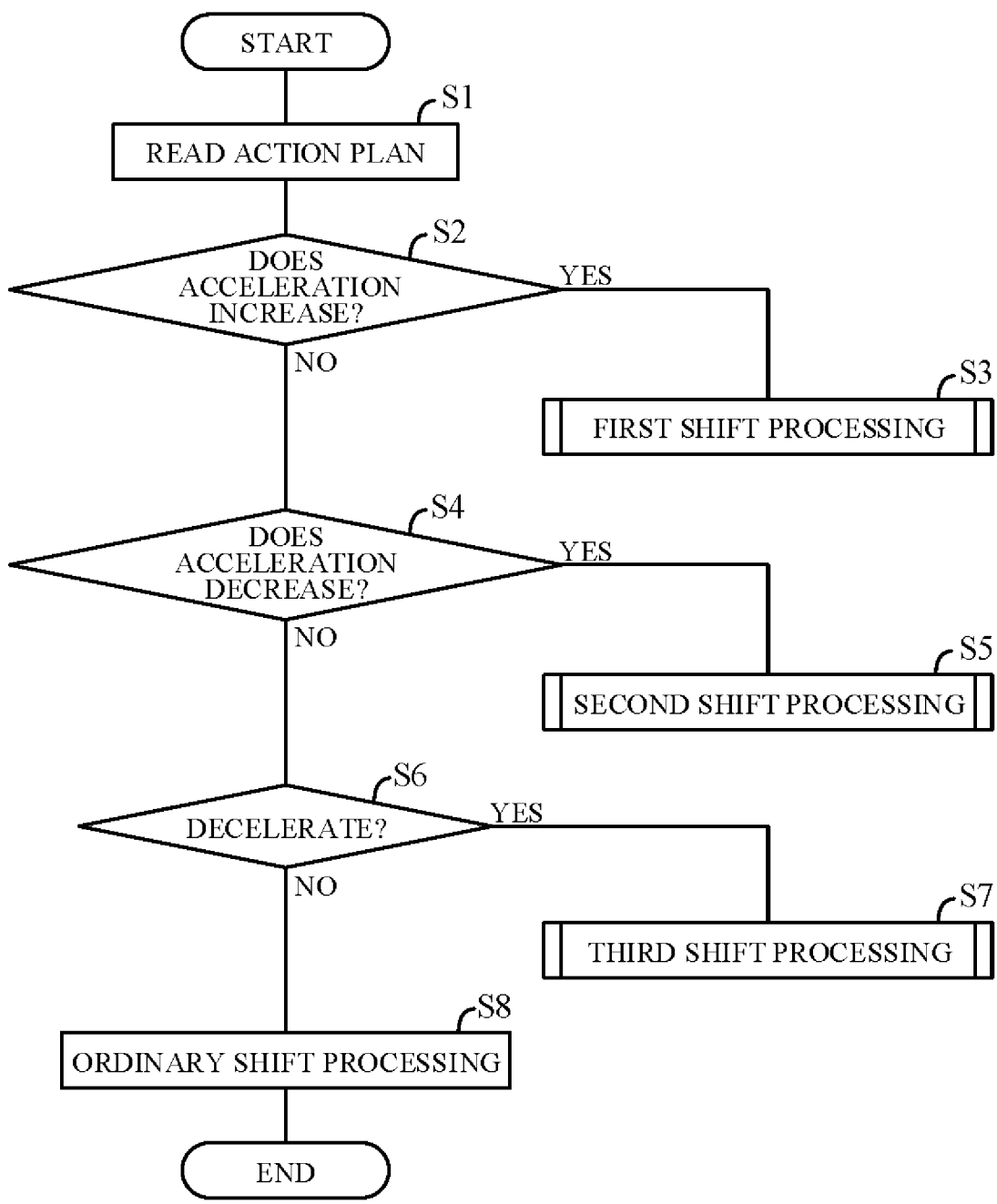
FIG. 8 is a flow chart showing an example of processing performed by a processing unit of FIG. 2.

In order to overcome the aforesaid problems, the vehicle control apparatus 100 according to the present embodiment is configured as explained in the following. The vehicle control apparatus 100 according to the present embodiment is characterized by the configuration of the processing unit 41 (particularly the driving control unit 46 thereof). FIG. 8 is a flowchart showing an example of processing performed by the processing unit 41, particularly processing related to speed ratio control. The processing shown in this flowchart is started when self-drive mode is selected and is repeated at predetermined intervals.

First in S1 (S: processing Step), data of an action plan output from the action plan generation unit 45 to cover from present time through a predetermined time period T1 ahead, i.e., vehicle speed data of every unit time Δt, are read. Next, in S2, whether acceleration of the subject vehicle 101 is to increase in the future is determined. This determination is performed, for example, by calculating acceleration of every unit time Δt and comparing present time point acceleration and next (Δt later) time point acceleration. If a positive decision is made at S2, the routine proceeds to S3, and if a negative decision is made, the routine proceeds to S4. In S3, first shift processing is performed as explained later.

In S4, whether acceleration of the subject vehicle 101 is to decrease in the future, i.e., whether drive mode is to transition to cruise mode, is determined. This determination is performed, for example, by comparing present time point acceleration and next (Δt later) time point acceleration among the accelerations of all unit times Δt calculated in S2. If a positive decision is made at S4, the routine proceeds to S5, and if a negative decision is made, the routine proceeds to S6. In S5, second shift processing is performed as explained later.

In S6, whether the subject vehicle 101 is to decelerate in the future is determined. This determination is performed by comparing present time point vehicle speed and next (Δt later) time point vehicle speed. If a positive decision is made at S6, the routine proceeds to S7, and if a negative decision is made, the routine proceeds to S8. In S7, third shift processing is performed as explained later. On the other hand, ordinary shift processing is performed in S8. Specifically, operation of the transmission 2 is controlled by ordinary speed ratio control for shifting speed stage in accordance with the shift map of FIG. 4 based on present time vehicle speed and required driving force.

Figure 9:
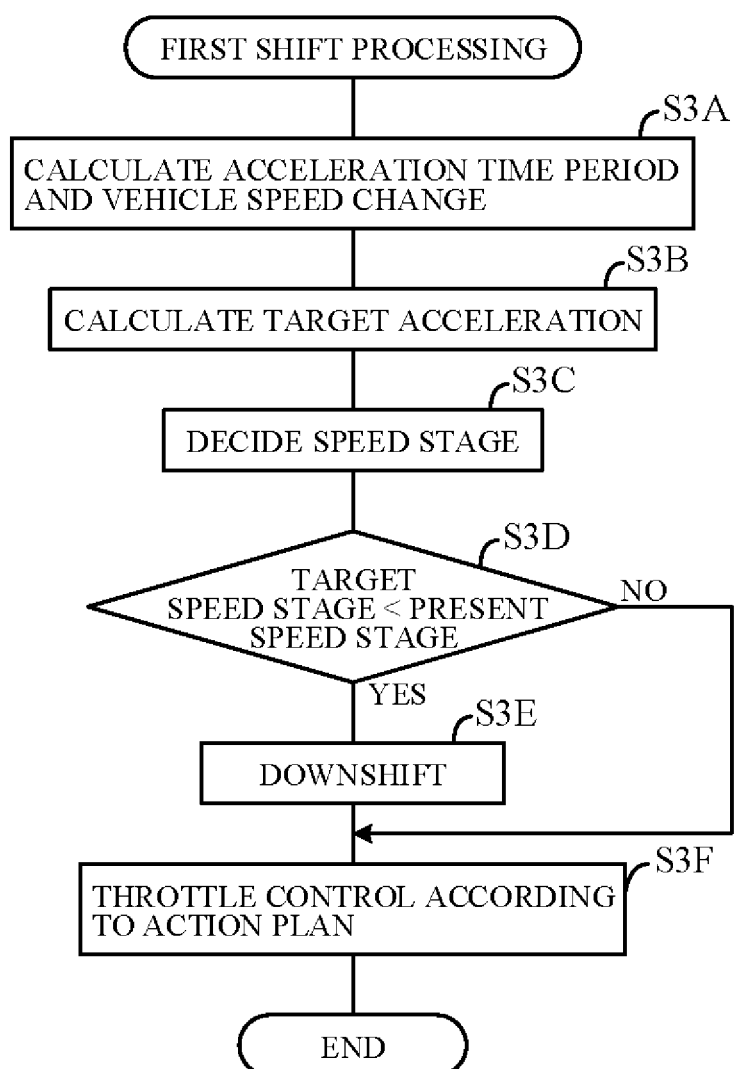
FIG. 9 is a flow chart showing an example of a first shift processing of FIG. 8.
Figure 10:
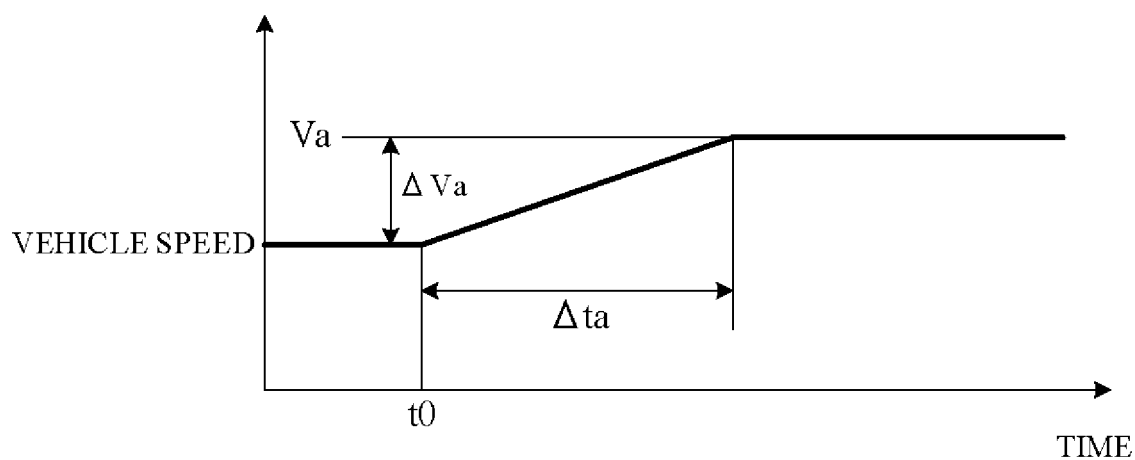
FIG. 10 is a time chart showing an example of change of a target vehicle speed.

FIG. 9 is a flowchart showing an example of the first shift processing of S3. First, in S3A, vehicle speed data within future predetermined time period T1 is utilized to calculate a time period longer than or equal to unit time Δt (acceleration time period) in which vehicle speeds continuously increase and vehicle speed after elapse of the acceleration time period (vehicle speed change). Specifically, in how many seconds vehicle speed is scheduled to increase to how many km/h is calculated. FIG. 10 is a diagram showing an example of target vehicle speed change per unit time Δt. In FIG. 10, target vehicle speed increases by ΔVa and reaches target vehicle speed Va in Δta seconds from present time t0. Δta is, for example, longer than unit time Δt and shorter than predetermined time period T1.

Figure 11:
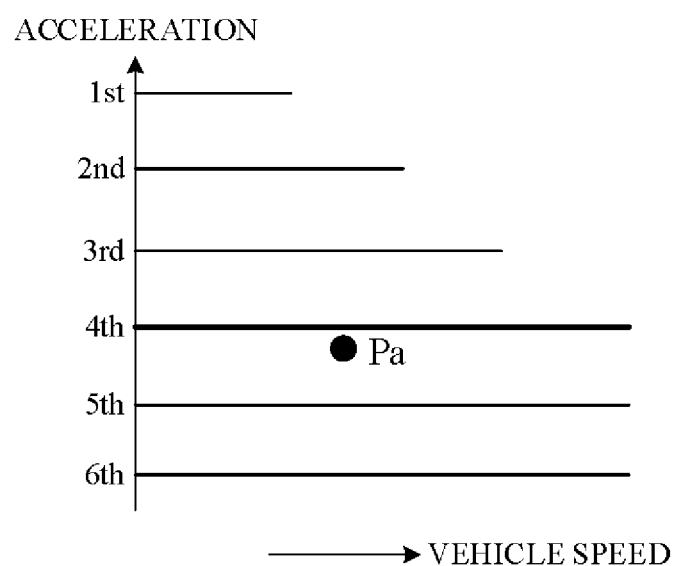
FIG. 11 is a diagram showing a relation between achievable vehicle speed and acceleration every speed stage.

Next, in S3B, acceleration time period Δta and vehicle speed change ΔVa calculated in S3A are used to calculate target acceleration. Next, in S3C, speed stage for obtaining the target acceleration is decided. FIG. 11 is a diagram showing relation between achievable vehicle speed and acceleration stored in association with respective speed stages in the memory unit 42. Acceleration is a value determined with consideration to a certain amount of running resistance owing to road gradient and the like. Acceleration achievable in the respective speed stages decreases with increasing running resistance. The diagram of FIG. 11 assumes for convenience that a given acceleration is achievable in every speed stage irrespective of vehicle speed, and acceleration decreases with higher speed stage. In S3C, the relationship of FIG. 11 is used to decide a target speed stage capable of achieving target acceleration and target vehicle speed after elapse of the acceleration time period. For example, where target acceleration and target vehicle speed are represented by point Pa of FIG. 11, the largest speed stage satisfying such target acceleration and target vehicle speed (4th stage in the drawing) is decided as the target speed stage. Alternatively, required driving force corresponding to the target acceleration can be calculated and the target speed stage decided from the shift map of FIG. 4.

Next, in S3D, whether the target speed stage decided in S3C is lower than present speed stage is determined, i.e., whether downshifting is necessary, is determined. If a positive decision is made at S3D, the routine proceeds to S3E, and if a negative decision is made, the routine skips S3E and proceeds to S3F. In S3E, a control signal is output to the shift actuator 23 to downshift the transmission 2.

Next, in S3F, in order to increase vehicle speed to target vehicle speed in line with the action plan, a control signal is output to the throttle actuator while keeping the transmission 2 in post-downshift speed stage. In other words, the subject vehicle 101 is accelerated by outputting a control signal to the throttle actuator in accordance with required driving force of sequential unit times Δt. Owing to the fact that speed stage is thus set with consideration to planned future acceleration within entire predetermined time period T1 and the vehicle 101 is thereafter accelerated, smooth acceleration in accordance with required driving force can be achieved.

Figure 12:
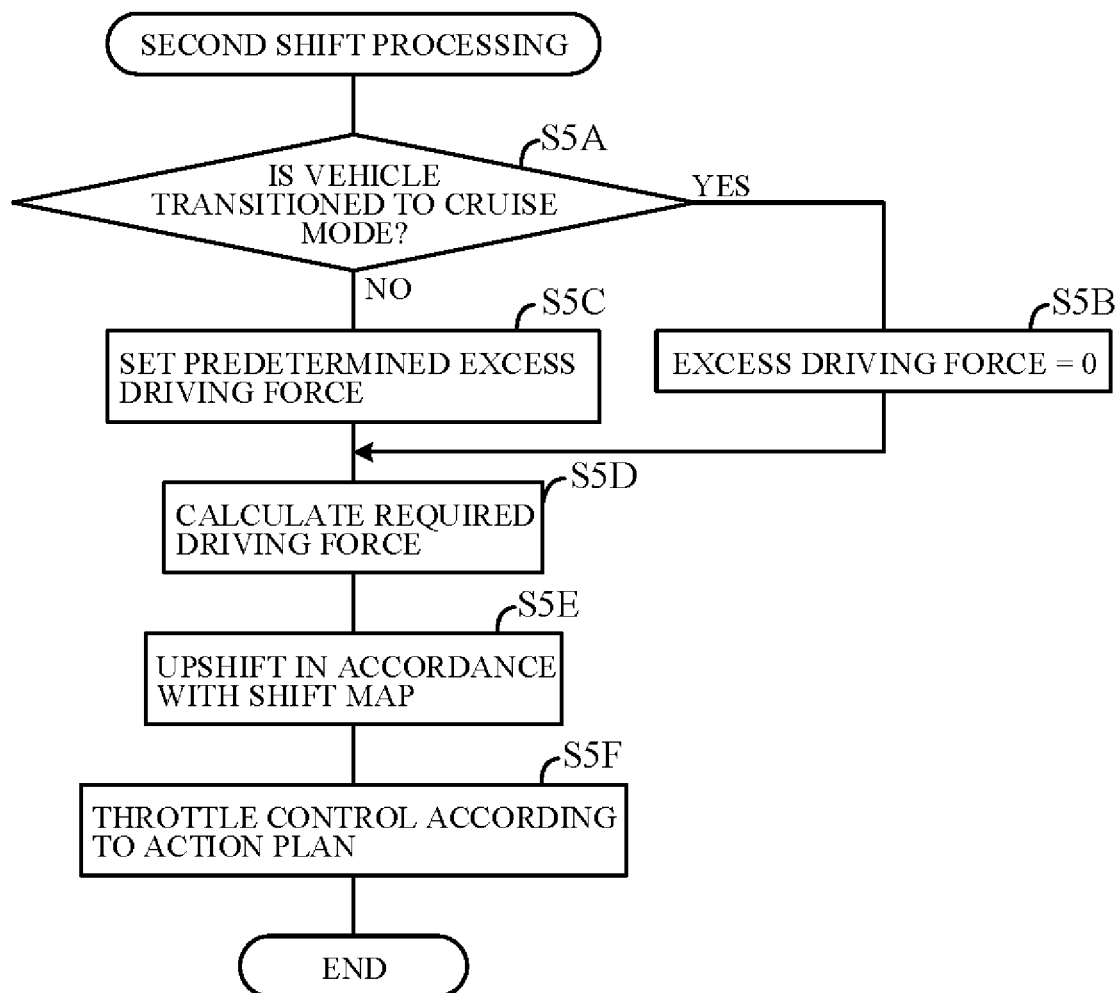
FIG. 12 is a flow chart showing an example of a second shift processing of FIG. 8.
Figure 13:
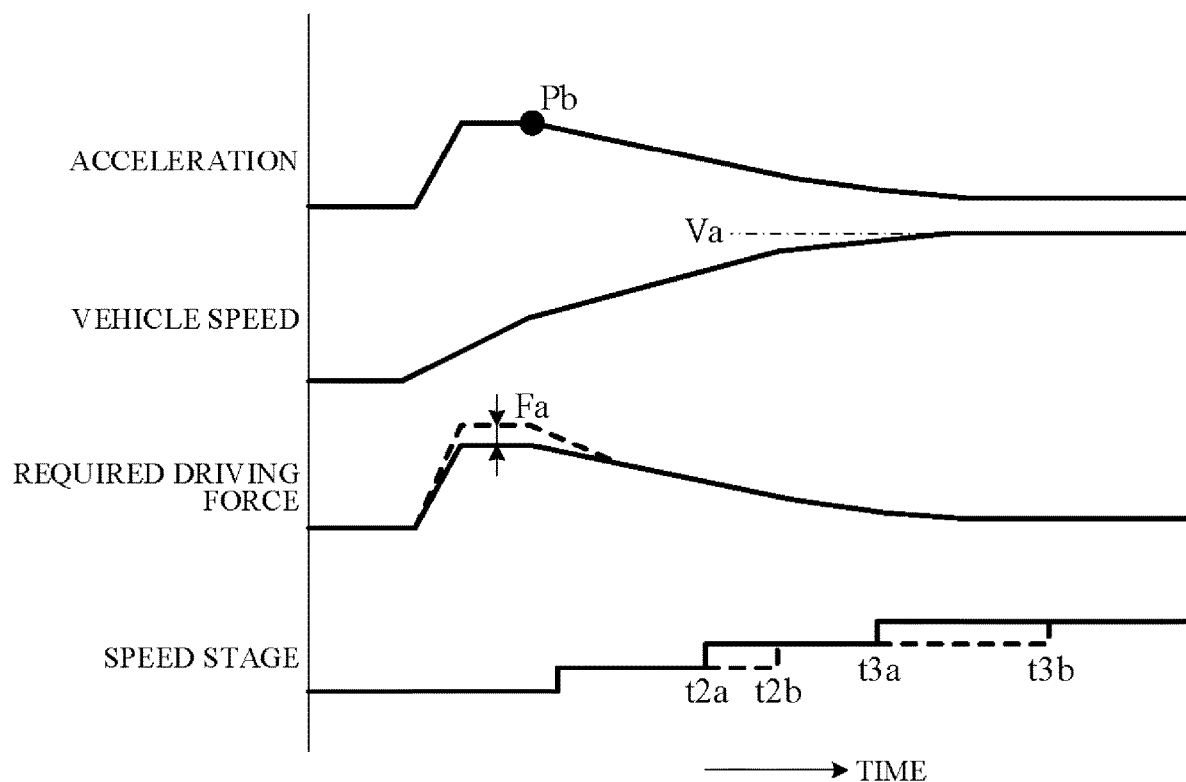
FIG. 13 is a time chart showing an example of operation in transition to cruising.

FIG. 12 is a flowchart showing an example of the second shift processing in S5 of FIG. 8. First, in S5A, whether the subject vehicle 101 is transitioned to cruise mode, i.e., cruise travel state, is determined from vehicle speed data within predetermined time period T1. Cruising is a drive mode entered when target vehicle speed approaches set vehicle speed Va or the subject vehicle 101 catches up with a preceding vehicle (vehicle 102). Therefore, in S5A, it is determined whether target acceleration of sequential unit times Δt is to gradually decrease in the future so that target acceleration falls to 0 within predetermined time period T1 or is to fall to 0 beyond predetermined time period T1. In other words, whether target acceleration is to fall to or below a predetermined value is determined. FIG. 13 is a diagram showing an example of changes in target acceleration, target vehicle speed, required driving force, and speed stage. In FIG. 13, target acceleration gradually decreases until vehicle speed reaches set vehicle speed Va and the subject vehicle 101 is determined to enter cruise mode when the decrease starts (point Pb), whereby a positive decision is made at S5A.

If a positive decision is made at S5A, the routine proceeds to S5B, and if a negative decision is made, the routine proceeds to S5C. In S5B, excess driving force Fa is set to 0. In this case, the excess driving force Fa should preferably not be suddenly set to 0 but be gradually brought to 0 over time as shown in FIG. 13. On the other hand, in S5C, a predetermined excess driving force Fa such as shown in FIG. 6 is set.

Next, in S5D, required driving force is calculated from target acceleration (e.g., target acceleration at the present time) calculated in S2. In a case where an excess driving force Fa is set in S5C, this calculated excess driving force Fa is added to the required driving force calculated in S5D. When excess driving force Fa is 0 in S5B, it is not added in S5D. Next, in S5E, the speed stage is upshifted in accordance with the shift map of FIG. 4 based on calculated required driving force.

Owing to this processing, the setting of excess driving force Fa to 0 at transition to cruise mode results in the transmission 2 being upshifted at times indicated by a solid curve in FIG. 13 (times t2a and t3a). In contrast, when, in a case other than at transition to cruise mode, a certain excess driving force Fa is added to required driving force, the transmission 2 is upshifted at times indicated by a dashed curve in FIG. 13 (times t2b and t3b). Therefore, since upshift time is advanced when transitioning to cruise mode, fuel economy and engine noise level performance are improved. Next, in S5F, a control signal is output to the throttle actuator in accordance with the action plan so as to transition the vehicle 101 to moderate acceleration or cruise mode.

Figure 14:
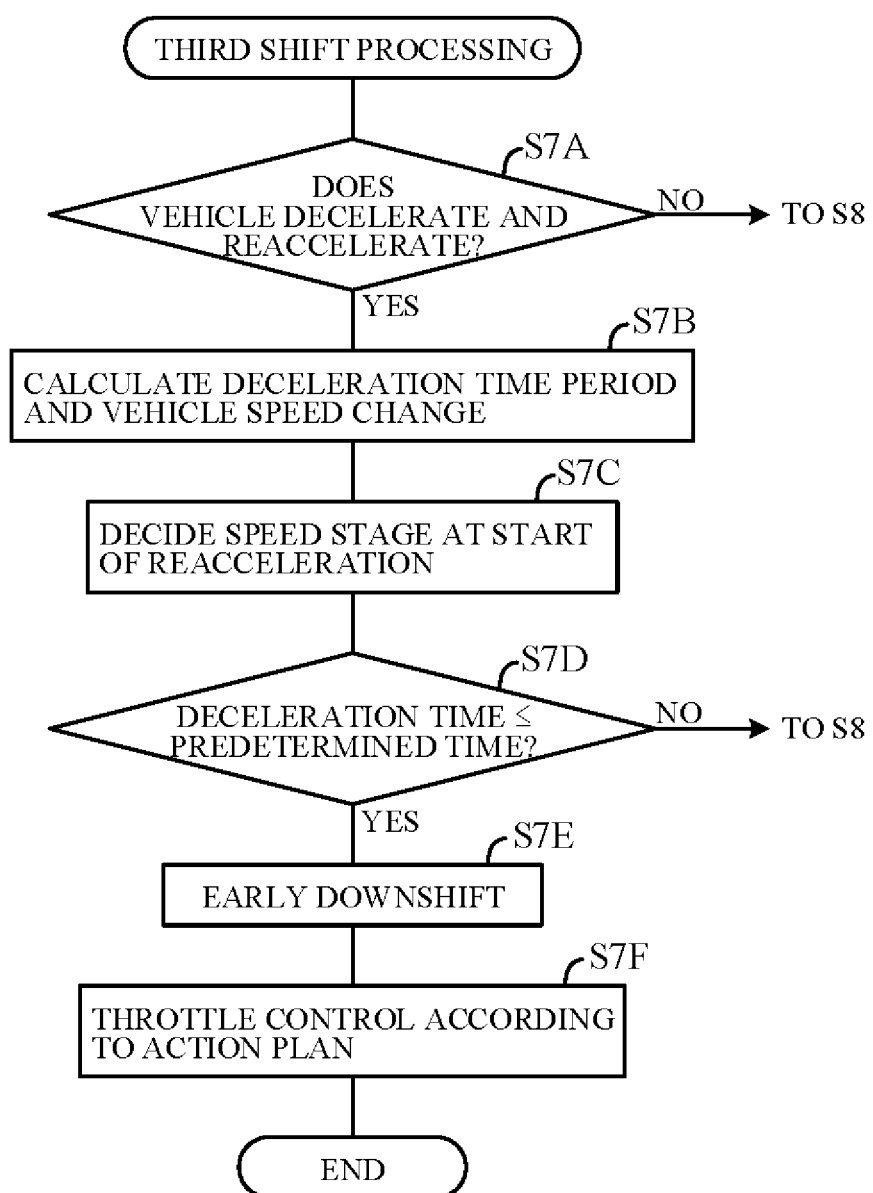
FIG. 14 is a flow chart showing an example of a third shift processing of FIG. 8.

FIG. 14 is a flowchart showing an example of the third shift processing in S7 of FIG. 8. First, in S7A, whether the subject vehicle 101 is to decelerate and reaccelerate is determined from future vehicle speed and other action plan data within predetermined time period T1. If a positive decision is made at S7A, the routine proceeds to S7B, and if a negative decision is made, the routine proceeds to S8 of FIG. 8. In S7B, in how many seconds vehicle speed is scheduled to be decreased to how many km/h and reaccelerated, i.e., scheduled deceleration time period and vehicle speed change, is calculated. Next, in S7C, speed stage at start of reacceleration is decided based on vehicle speed and required driving force at start of reacceleration.

Figure 15:
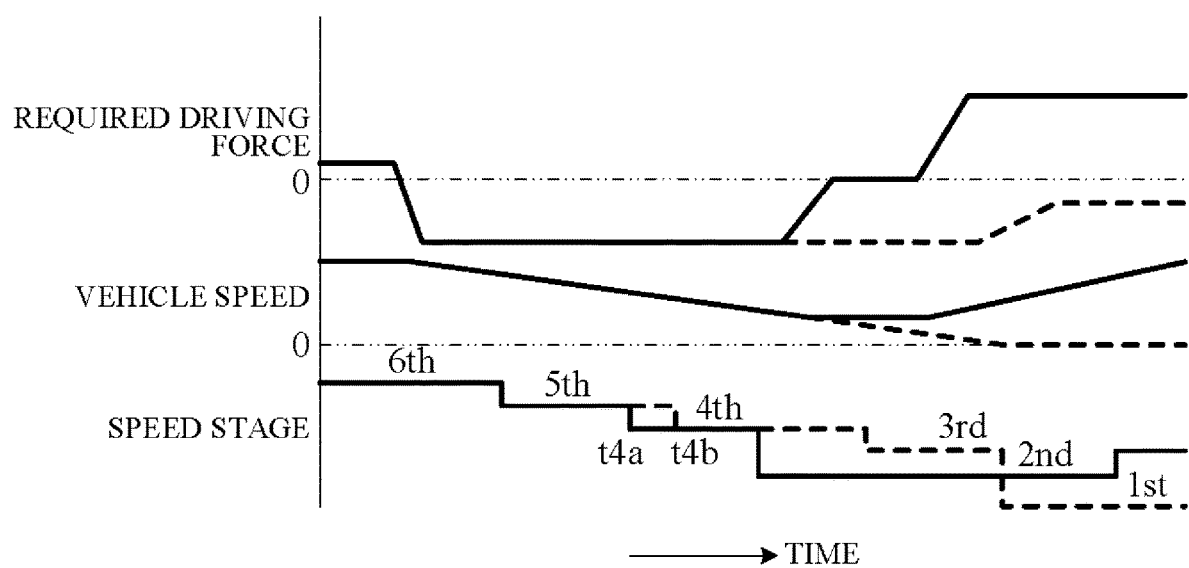
FIG. 15 is a time chart showing an example of an operation during cornering.

FIG. 15 a diagram showing an example of changes in required driving force, target vehicle speed, and speed stage. Solid curves in this diagram represent characteristics during cornering including reacceleration following deceleration, e.g., characteristics in the case of a left turn (in region with left-side traffic) at a green-light intersection or case of negotiating a curve. Dashed curves represent characteristics when stopping after deceleration, e.g., characteristics in the case of stopping at a red-light intersection. In FIG. 15, 2nd speed is decided as speed stage at start of reacceleration (at completion of deceleration), and 1st speed is decided as speed stage when stopped after deceleration.

Next, in S7D, whether deceleration time period is equal to or less than predetermined time period is determined. If a positive decision is made at S7D, the routine proceeds to S7E, and if a negative decision is made, the routine proceeds to S8 of FIG. 8. In S7E, a control signal is output to the shift actuator 23 so as to downshift the transmission 2 early. For example, the downshift curve f2 of FIG. 4 is shifted to vehicle high speed side, and the transmission 2 is downshifted in accordance with the so-shifted shift map. As a result, downshifting is, for example, performed at time t4a earlier than time t4b in FIG. 13, whereby downshift time is advanced.

At this time, a situation may arise in which multiple downshifts (by two or more stages) are required before the speed stage decided in S7C (e.g., 2nd speed) can be implemented, and, moreover, time to completion of deceleration is equal to or less than predetermined time period. Since stage-by-stage downshifting would not be quick enough in such a case, downshifting is performed by skip shifting, i.e., by omitting one or more speed stages in the shift sequence. For example, downshifting is performed by skipping from 4th speed to 2nd speed in FIG. 15. Next, in S7F, a control signal is output to the throttle actuator so as to accelerate the vehicle 101 in accordance with the action plan. Therefore, in a case where the vehicle 101 reaccelerates after once decelerating, as during cornering, the transmission 2 is switched upon completion of deceleration to a speed stage suitable for reacceleration, whereby the vehicle 101 can be reaccelerated without delay to ensure smooth cornering.

The aforesaid embodiment can achieve advantages and effects such as the following:

(1) The vehicle control apparatus 100 according to the present embodiment is configured to control the self-driving vehicle 101 with self-driving capability including the engine 1 and the transmission 2 installed in the power transmission path from the engine 1 to the drive wheels 3 (FIG. 1). Specifically, the vehicle control apparatus 100 includes: the action plan generation unit 45 for generating an action plan of the subject vehicle 101 including position data and vehicle speed data of the subject vehicle 101 for every unit time Δt from the present time through a predetermined time period T1; and the driving control unit 46 for controlling the engine 1 and the transmission 2 so that the subject vehicle 101 travels by self-driving in accordance with the action plan generated by the action plan generation unit 45 (FIG. 2). The action plan includes a target vehicle speed defined as vehicle speed after continuously increasing to beyond the unit time Δt (e.g., Va of FIG. 10) and a target time period Δta defined as time period from present time to time target vehicle speed is achieved (FIGS. 10, 13 and 15). Alternatively, the target vehicle speed can be vehicle speed after continuously decreasing to beyond the unit time Δt. The driving control unit 46 controls the engine 1 and the transmission 2 so that the subject vehicle 101 accelerates based on the target time period (acceleration time period) Δta and a vehicle speed change ΔVa up to the target vehicle speed (vehicle speed change amount) (FIG. 9). As a result, optimum speed stage of the transmission 2 can be set with consideration to the acceleration action plan from the present time through predetermined time period T1 (>Δt). Since this enables smooth acceleration of the vehicle 101, passengers of the self-driving vehicle 101 experience excellent ride comfort.

(2) When acceleration of the subject vehicle 101 increases (S2), the driving control unit 46 controls the transmission 2 to a speed ratio in accordance with the target vehicle speed and the target acceleration (FIG. 11) and thereafter keeps the speed ratio constant while controlling the throttle actuator of the engine 1 to accelerate the subject vehicle 101 toward the target vehicle speed (FIG. 9). Therefore, since the engine 1 is controlled in accordance with the required driving force after downshifting to a speed stage capable of obtaining the target acceleration, acceleration to the target vehicle speed can be smoothly achieved without delay.

(3) The transmission 2 is configured as a stepped transmission that performs stepwise speed ratio shifting. When downshifting the transmission 2 to a certain speed stage in preparation for acceleration immediately after deceleration (e.g., to 2nd speed of FIG. 15), the driving control unit 46 controls the transmission 2 to downshift stage by stage when time required to completion of deceleration is determined to be longer than or equal to a predetermined time and controls the transmission 2 to downshift by skip shifting when the time required is determined to be less than the predetermined time (FIG. 14). Therefore, during cornering, such as when making a left turn at a green-light intersection, the vehicle 101 can smoothly reaccelerate after decelerating and turning left.

(4) The driving control unit 46 on the one hand controls the transmission 2 to downshift when an operating point Q1 corresponding to the vehicle speed and the required driving force at the present time crosses a predefined downshift curve f2, and on the other hand controls the transmission 2 to upshift when an operating point Q3 obtained by adding a predetermined excess driving force Fa to an operating point Q2 corresponding to the vehicle speed and the required driving force crosses a predefined upshift curve f1 (FIG. 4). The required driving force in this case is calculated in accordance with acceleration based on the aforesaid target time period Δta and the vehicle speed change ΔVa (FIG. 10) when acceleration of the subject vehicle 101 increases, and under other conditions is calculated in accordance with acceleration of every unit time Δt. This prevents shift hunting during ordinary speed ratio control (S8), for example.

(5) The driving control unit 46 determines whether vehicle acceleration is decreasing toward 0, i.e., whether transitioning to cruising, based on vehicle speed data included in the action plan for every unit time Δt in the predetermined time period T1 after the present time, and when transition to cruising is determined, it sets excess driving force Fa to 0 (S5B). Therefore, since upshift time is advanced during transitioning from acceleration to cruising, fuel economy and engine noise level performance are enhanced.

A point requiring attention here is that when the subject vehicle 101 is traveling in accordance with an action plan generated by the action plan generation unit 45 (FIG. 2), its travel may be hindered by surrounding vehicles and the like. For example, action plan implementation is hindered in cases such as when the subject vehicle 101 is operating in accordance with a constant speed action plan for cruising and a vehicle on a neighboring lane cuts in front of the subject vehicle 101 or when the subject vehicle 101 changes lanes in accordance with an action plan for overtaking the vehicle 102 ahead and the preceding vehicle 102 similarly changes lanes.

In such situations, the action plan generation unit 45 coordinates the action plan with behavior of surrounding vehicles. Actually, it generates a new action plan for this purpose. The driving control unit 46 then controls the actuators AC in accordance with the new action plan, thereby adjusting running speed, path and the like of the subject vehicle 101 according to surrounding circumstances. However, any hindrance to the action plan that arises is generally temporary, so that the original action plan is often shortly restored. For example, when the subject vehicle 101 changes lanes in accordance with an action plan for overtaking the preceding vehicle 102 and the preceding vehicle 102 similarly changes lanes but then quickly changes back to the original lane, the action plan for changing lanes and overtaking the preceding vehicle 102 is regenerated.

In the case of such a temporary hindrance to the action plan, the subject vehicle 101 would be prevented from running smoothly should vehicle operating conditions (e.g., speed stage) be changed every time the action plan changes. For example, shift hunting, i.e., repeated upshifting and downshifting of the transmission 2, might occur. In the present embodiment, the vehicle control apparatus 100 is therefore configured so that the controller 40 (its processing unit 41) performs processing in the following manner.

Figure 16:
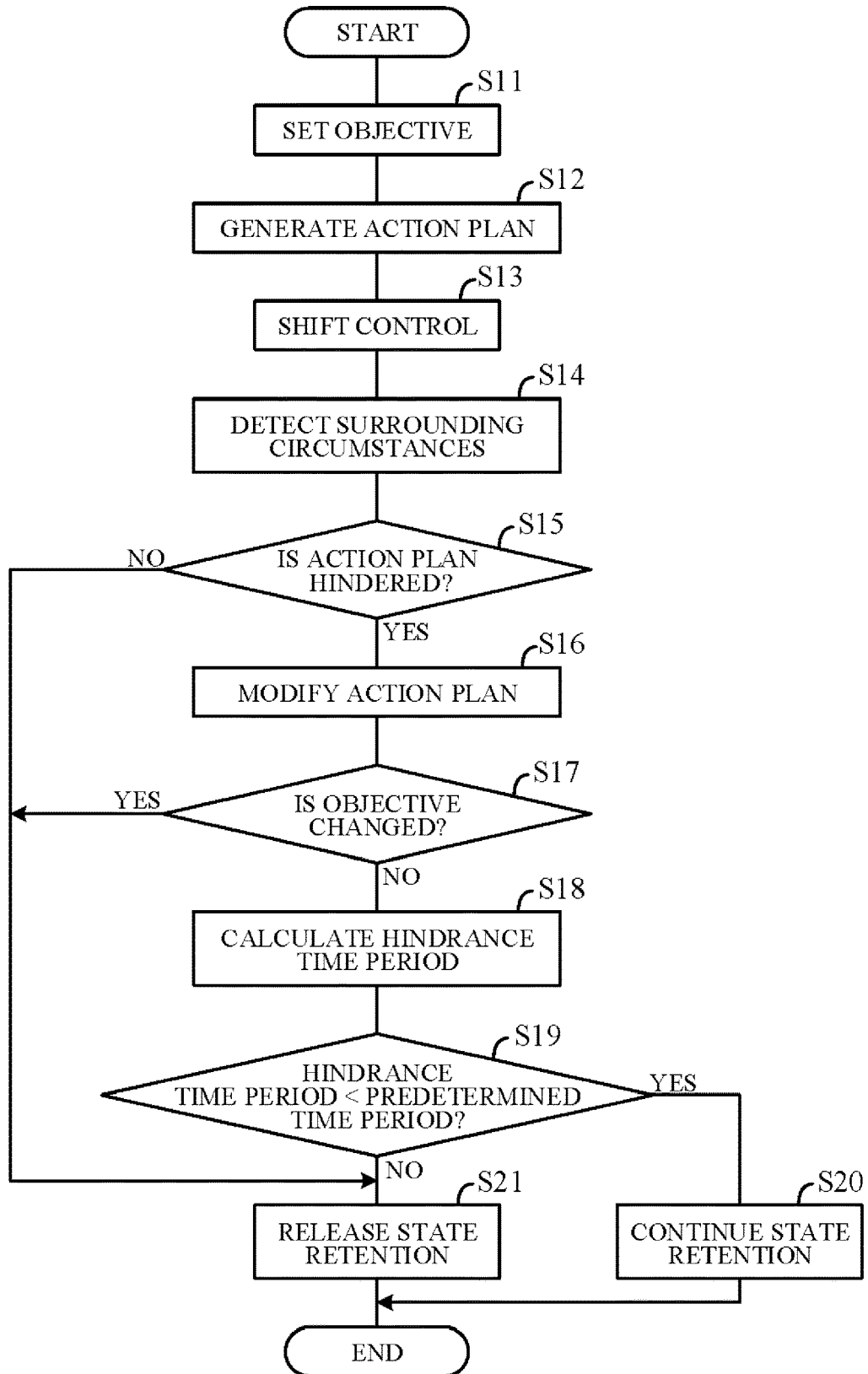
FIG. 16 is a flow chart showing another example of processing performed by a processing unit of FIG. 2.

FIG. 16 is a flowchart showing an example of processing performed by the processing unit 41, particularly processing related to shift control, when the action plan is hindered. The processing shown in this flowchart is started upon selection of self-drive mode and repeated at predetermined intervals.

First, in S11, the objective to be achieved by the subject vehicle 101 (travel objective) is set as an action plan criterion. Travel objectives include, inter alia, cruising at a predetermined speed, preceding vehicle overtaking, deceleration followed by left turn and reacceleration, and deceleration followed by stopping. When the action plan generation unit 45 generates a target path based on circumstances around the subject vehicle 101 recognized by the exterior recognition unit 44 it sets a travel objective. Next, in S12, it generates an action plan for achieving the travel objective (hereinafter called "first action plan"). For example, in order to achieve cruising at a certain vehicle speed as an objective, it generates a first action plan for overtaking the preceding vehicle 102.

Next, in S13, the driving control unit 46 decides the speed stage of the transmission 2 based on the generated first action plan and outputs a control signal to the shift actuator 23 to control the speed stage. As a result, when an action plan for overtaking the preceding vehicle 102 is generated, for example, the transmission 2 is downshifted in preparation for acceleration for achieving the action plan. The driving control unit 46 also controls other actuators AC in accordance with the first action plan. Next, in S14, surrounding circumstances of the subject vehicle 101 are detected based on signals from the exterior sensor group 31.

Next, in S15, the action plan generation unit 45 determines whether a situation that hinders the first action plan has arisen, e.g., whether another vehicle cut in front of the subject vehicle 101. If a positive decision is made at S15, the routine proceeds to S16, and if a negative decision is made, the routine proceeds to S21. In S16, the action plan generation unit 45 modifies the action plan in accordance with the nature of the hindrance. The modified action plan is hereinafter called "second action plan". Next, in S17, whether the travel objective is changed is determined.

When modifying the action plan, the action plan generation unit 45 sometimes changes the travel objective in accordance with the nature of the hindrance. For example, in a case where achieving the initial objective within predetermined time period is obviously impossible, the action plan generation unit 45 sets a new objective matched to the surrounding circumstances. At this time, a positive decision is made at S17 and the routine proceeds to S21. On the other hand, if a negative decision is made at S17, the routine proceeds to S18. In S18, for how long the first action plan has been hindered (hindrance time period T2) is calculated based on the surrounding circumstances of the subject vehicle 101 detected by the exterior sensor group 31 and recognized by the exterior recognition unit 44. In other words, hindrance time period (duration time of hindrance) T2 is calculated as time elapsed after the first action plan is hindered. Hindrance time period T2 can instead be calculated as time estimated to elapse after first action plan is hindered rather than as time elapsed after first action plan is hindered.

Next, in S19, whether the calculated hindrance time period T2 is less than a preset predetermined time period T3 is determined. This is for determining whether the hindrance of the first action plan is temporary. Predetermined time period T3 is, for example, set longer than unit time Δt (e.g., 0.1 sec) and shorter than predetermined time period T1 during which the action plan is generated (e.g., 5 seconds), particularly to around 3 to 4 seconds as a specific example. Optionally, the predetermined time period T3 can be suitably varied in accordance with the circumstances of the hindrance of the first action plan. Predetermined time period T3 can be set longer than predetermined time period T1. If a positive decision is made at S19, the routine proceeds to S20, and if a negative decision is made, the routine proceeds to S21.

In S20, speed stage state retention by the driving control unit 46 is continued. Therefore, even if the operating point determined by vehicle speed and required driving force, i.e., the operating point according to the second action plan, should cross upshift curve f1 of FIG. 4, the driving control unit 46 does not perform upshifting and the speed stage is maintained in the speed stage according to the first action plan. On the other hand, in S21, speed stage state retention is released. Therefore, when the operating point crosses upshift curve f1 in FIG. 4, for example, the driving control unit 46 performs upshifting and the speed stage is changed to the speed stage in accordance with the second action plan.

Figure 17:
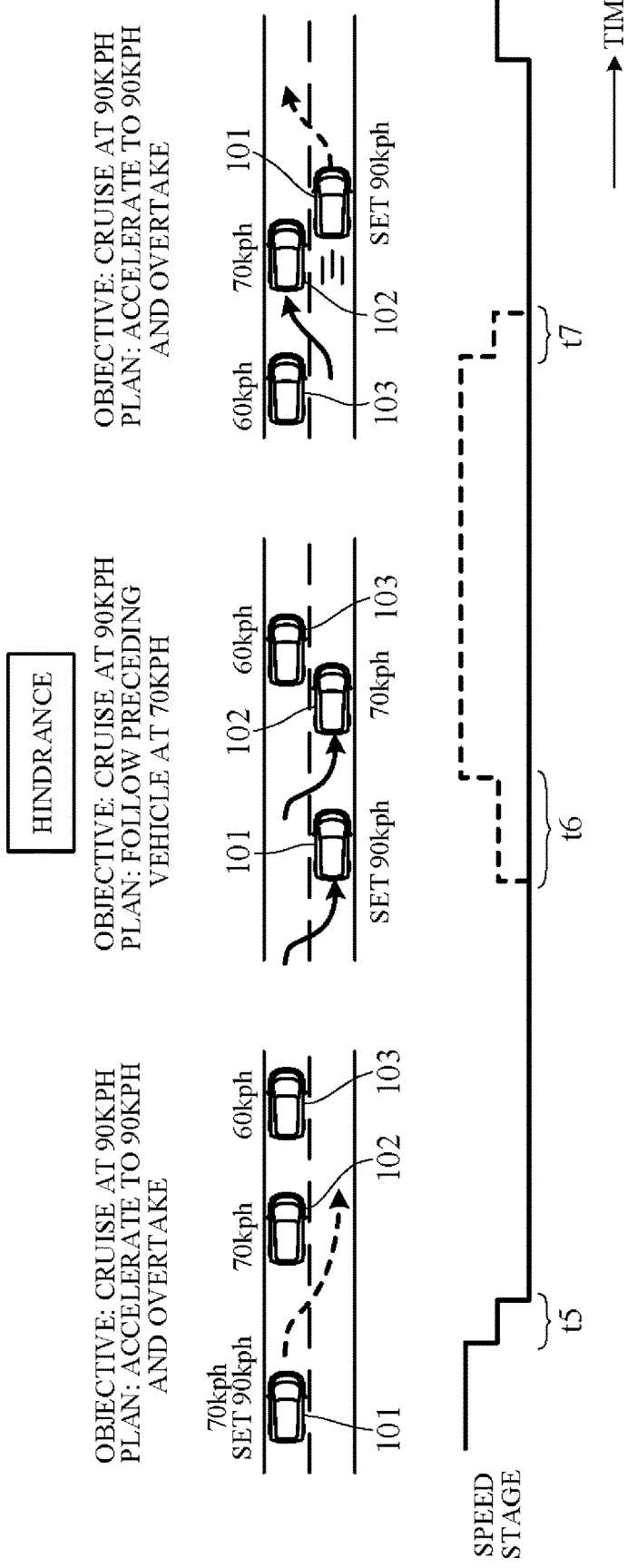
FIG. 17 is a diagram showing a first example of an operation by processing in the flow chart of FIG. 16.

Operation in a case of action plan hindrance, i.e., operation of the subject vehicle 101 in accordance with the flowchart of FIG. 16, is explained more concretely in the following. FIG. 17 is a diagram showing as an example a case of the first action plan of the subject vehicle 101 being hindered because while the subject vehicle 101 is attempting to overtake the preceding vehicle 102 in accordance with the first action plan, the preceding vehicle 102 attempts to overtake a vehicle 103 ahead of it. Although objectives and plans at respective time points are assigned specific numerical values in the following, the cited values are merely examples for making the explanation easier to understand.

As shown in FIG. 17, when the action plan generation unit 45 sets a travel objective (S11) and further generates an overtake first action plan in accordance with the travel objective (S12), required driving force increases. As a result, the speed stage of the subject vehicle 101 is downshifted in accordance with the shift map of FIG. 4 at time t5 in preparation for acceleration (S13). When the subject vehicle 101 thereafter attempts to change lanes and accelerate, the first action plan is hindered by the preceding vehicle 102 changing lanes in order to overtake the vehicle 103. The action plan generation unit 45 therefore generates a second action plan in accordance with the circumstances of the hindrance (S16).

At this time, the driving control unit 46 calculates hindrance time period T2 during which the first action plan is hindered (S18), and the speed stage is maintained unchanged, i.e., downshifted, until hindrance time period T2 reaches predetermined time period T3 (S20). In other words, although decrease in required driving force of the subject vehicle 101 owing to the lane change of the preceding vehicle 102 would ordinarily lead to upshifting at time t6 as indicated by a dashed curve, upshifting is instead prohibited. When hindrance of the first action plan thereafter ceases to exist at time t7 before elapse of the predetermined time period T3 because the preceding vehicle 102 changed lanes, the driving control unit 46 again generates a first action plan. Since the downshifted state of the speed stage is still maintained at this time, the subject vehicle 101 can promptly accelerate in accordance with the modified first action plan.

In contrast, should the downshifted condition not be maintained but an upshift performed at time t6, a downshift would be performed again a time t7. Since this would result in shift hunting with alternate upshifts and downshifts, it would adversely affect ride comfort. Predetermined time period T3 need not be defined as a fixed time but can optionally be varied in accordance with circumstances of the hindrance. For example, when vehicle speed of the preceding vehicle 102 is faster than that of the vehicle 103 by a certain value, it is reasonable to conclude that the vehicle 102 is highly likely to change lanes after overtaking the vehicle 103. In such cases, predetermined time period T3 can be set with consideration to how much time the vehicle 102 is likely to need to overtake the vehicle 103 (estimated overtake time period). The estimated overtake time period, or a time period obtained by adding a certain time period to the estimated overtake time period, can, for example, be defined as predetermined time period T3.

Figure 18:
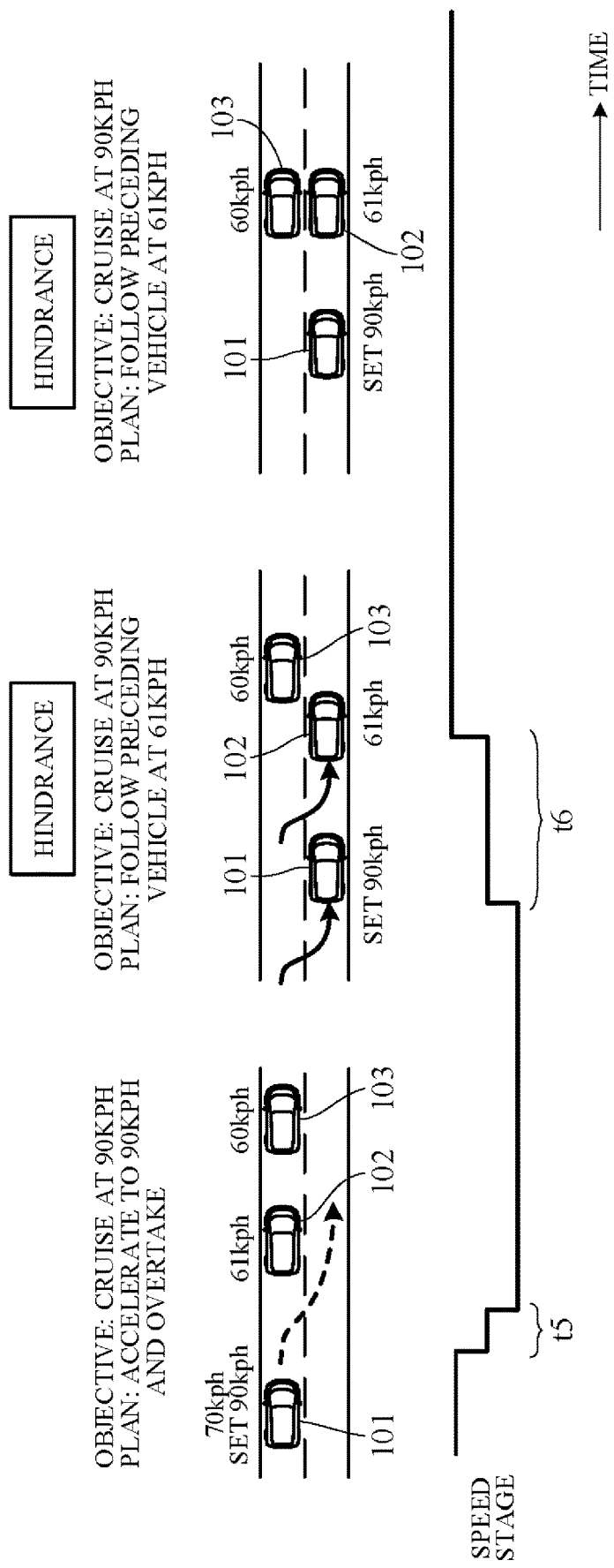
FIG. 18 is a diagram showing a second example of an operation by processing in the flow chart of FIG. 16.

FIG. 18 is a diagram showing an example in which hindrance time period T2 is determined likely to exceed predetermined time period T3. When, as indicated in the example of FIG. 18, vehicle speed difference between the vehicle 102 and the vehicle 103 is small, time until the preceding vehicle 102 changes lanes after overtaking the vehicle 103, i.e., time until hindrance of the first action plan ceases to exist, is determined to be at least predetermined time period T3 or greater. Therefore, speed stage state retention is released at time t6 (S21), and the transmission 2 upshifts in accordance with the second action plan. Since this prevents continuance of the downshifted state for predetermined time period T3 or longer notwithstanding that the action plan is modified, it improves fuel economy and engine noise level performance.

Figure 19:
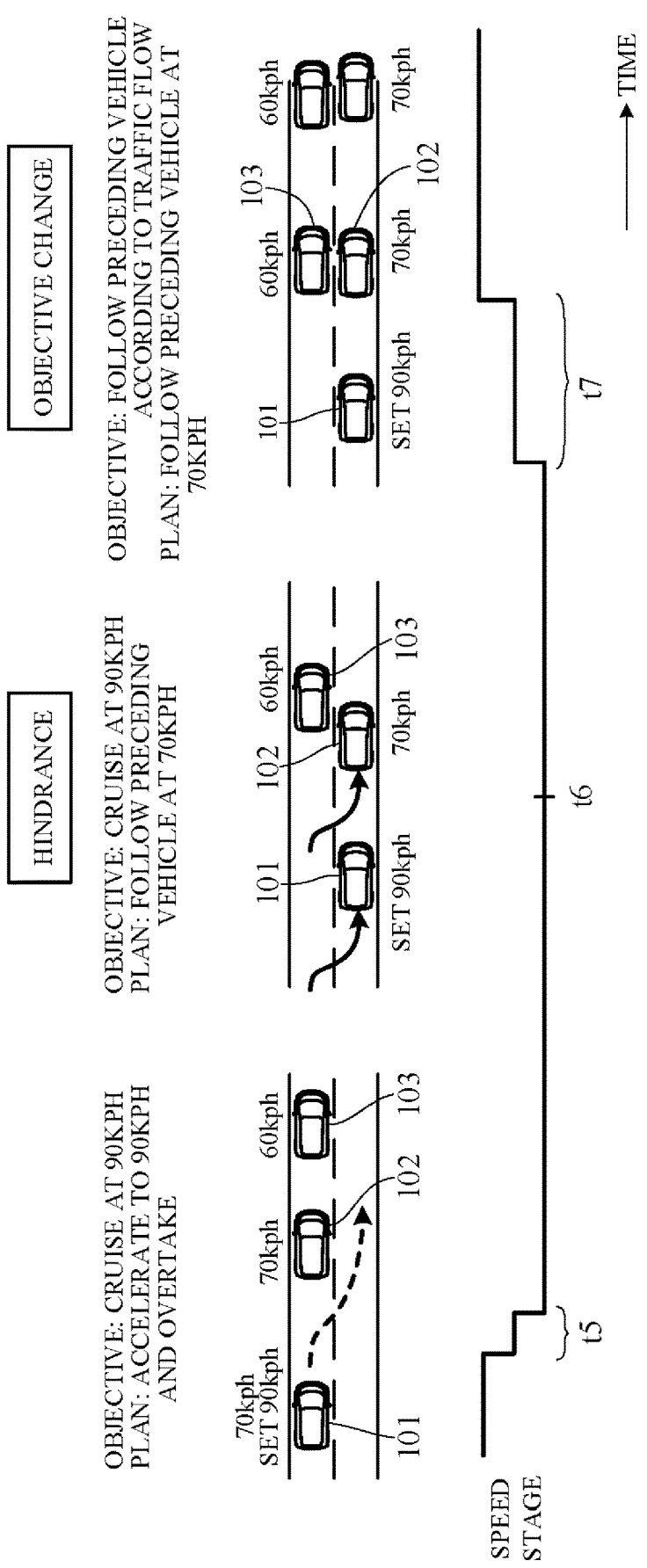
FIG. 19 is a diagram showing a third example of an operation by processing in the flow chart of FIG. 16.

FIG. 19 is a diagram showing an example in which travel objective is changed after the first action plan is hindered. As indicated in FIG. 19, when, after determining that the first action plan has been hindered, the action plan generation unit 45 then determines from surrounding circumstances that the hindrance to the first action plan is not temporary, e.g., when it determines that the hindrance to the first action plan is obviously not likely to disappear within predetermined time period T3, for example, it modifies the travel objective. As a result, speed stage state retention is released at time t7 (S17→S21), and the transmission 2 upshifts in accordance with the second action plan. When travel objective is changed in this manner, state retention is released irrespective of whether predetermined time period T3 passed, so that continuance of downshifted state longer than necessary is prevented.

Figure 20:
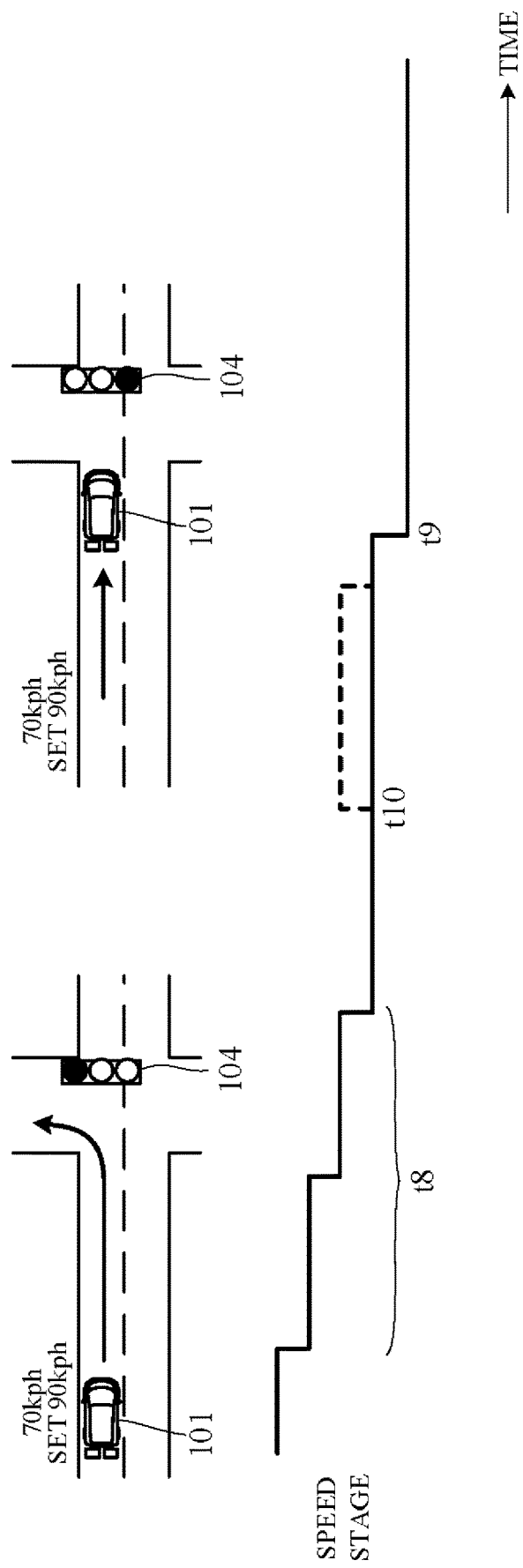
FIG. 20 is a diagram showing a fourth example of an operation by processing in the flow chart of FIG. 16.

FIG. 20 is a diagram showing another example in which travel objective is changed after the first action plan is hindered. As a specific example, a case is illustrated in which the subject vehicle 101 is about to decelerate and reaccelerate to perform cornering but instead has to stop because a traffic light 104 turned red. In the example shown in FIG. 20, the traffic light turns red after a downshift in accordance with the first action plan is performed during deceleration of the subject vehicle 101 at time t8 in preparation for reacceleration (e.g., early downshift in S7E of FIG. 14), whereafter the action plan is modified and the travel objective changed. This results in release of speed stage state retention (S21) and downshifting of the transmission 2 at time t9.

In this case, when state retention is released in S20, the transmission 2 is preferably controlled to enable downshift and prohibit upshift. Implementing this measure prevents repeated downshifting and upshifting that is apt to occur during deceleration and stopping of the subject vehicle 101, such as early downshifting of the transmission in accordance with the first action plan, followed by upshifting as indicated by a dashed curve in FIG. 20 (at time t10), and additionally by downshifting in accordance with an ordinary shift map.

The present embodiment can achieve advantages and effects such as the following:

(1) The vehicle control apparatus 100 is configured to control a self-driving vehicle 101 including an engine 1 and a transmission 2 installed in the power transmission path from the engine 1 to drive wheels 3, and includes: an exterior sensor group 31 for detecting external conditions (surrounding circumstances) of the subject vehicle 101, the action plan generation unit 45 for generating an action plan including a target path PA of the subject vehicle 101 based on surrounding circumstances detected by the exterior sensor group 31, and the driving control unit 46 for controlling the engine 1 and the transmission 2 so the subject vehicle 101 self-drives in accordance with the action plan generated by the action plan generation unit 45 (FIG. 2). After generation of the first action plan, the action plan generation unit 45 determines based on surrounding circumstances detected by the exterior sensor group 31 whether the first action plan is hindered, and when the first action plan is determined to be hindered, generates a second action plan (FIG. 16). After generation of the second action plan by the action plan generation unit 45, the driving control unit 46 calculates hindrance time period T2 as time period the action plan generation unit 45 determines or estimates the first action plan to be hindered, determines whether hindrance time period T2 is less than the predetermined time period T3, and controls the transmission 2 to keeps speed ratio at speed ratio in accordance with the first action plan when hindrance time period T2 is determined to be shorter than predetermined time period T3, and to change speed ratio in accordance with the second action plan when hindrance time period T2 is determined to be equal to or longer than predetermined time period T3 (FIG. 16). As a result, when hindrance of the action plan is temporary, speed ratio is maintained at a value according to the first action plan even if the action plan is changed from the first action plan to the second action plan. Therefore, since frequent upshifting and downshifting of the transmission 2 is prevented, the subject vehicle 101 can achieve optimum self-driving and smooth running.

(2) The action plan generation unit 45 sets the travel objective and generates the action plan for achieving the set objective. When the first action plan is hindered and the objective is changed upon generation of a second action plan, the driving control unit 46 controls the transmission 2 so as to control speed ratio to speed ratio in accordance with the second action plan irrespective of length of hindrance time period T2 (FIG. 16). Therefore, when hindrance to the first action plan is clearly determined not to be temporary, upshifting and the like are permitted during acceleration. As a result, retention of the downshifted state is released early, a contribution to fuel economy and the like can be expected.

(3) The first action plan includes an acceleration plan including downshift (FIGS. 17 and 18). When a second action plan is generated owing to hindrance of the first action plan, the driving control unit 46 keeps downshifted state when hindrance time period T2 is determined to be shorter than predetermined time period T3 and controls the transmission 2 to cancel the downshifted state when hindrance time period T2 is determined to be equal to or longer than predetermined time period T3 (FIG. 16). Since this enables prompt acceleration of the subject vehicle 101 when hindrance of the first action plan ceases to exist within predetermined time period T3, the preceding vehicle 102 can be smoothly overtaken. Moreover, since the transmission 2 is upshifted in accordance with the second action plan when the hindrance of the first action plan continues for predetermined time period T3 or longer, fuel economy and engine noise level improve.

(4) The first action plan includes a deceleration plan including downshift, while the second action plan includes stopping following deceleration (FIG. 20). When the first action plan is hindered and the objective is changed upon generation of the second action plan, the driving control unit 46 controls the transmission 2 to prohibit from upshifting and allow to downshift (FIG. 16). As a result, repeated downshifting and upshifting can be prevented when the second action plan for stopping is generated after the first action plan for acceleration following deceleration is generated.

In the aforesaid embodiment, when a second action plan is generated owing to hindrance of the first action plan, the driving control unit 46 keeps speed ratio of the transmission at the speed ratio according to the first action plan (a first transmission speed ratio) or changes speed ratio of the transmission to the speed ratio in accordance with the second action plan (a second transmission speed ratio). In other words, a configuration is adopted that controls the transmission 2 as one element among driving components contributing to driving operation of the subject vehicle 101. However, the driving control unit 46 can be adapted to control a driving component other than a transmission. Specifically, the driving control unit is not limited to the aforesaid configuration insofar as it is one that, when a second action plan is generated by the action plan generation unit 45, calculates hindrance time period T2 as time period the action plan generation unit 45 determines or estimates the first action plan to be hindered, determines whether hindrance time period T2 is shorter than the predetermined time period T3, and controls the driving unit to keep a state of a driving component in a first state in accordance with the first action plan when hindrance time period T2 is determined to be shorter than predetermined time period T3 and to change the state of the driving component to a second state in accordance with the second action plan when hindrance time period T2 is determined to be equal to or longer than predetermined time period T3.

In the aforesaid embodiment, the exterior recognition unit 44 is adapted to recognize external conditions based on detection values of the external sensor group 31. However, a surrounding circumstances detector for detecting surrounding circumstances of the subject vehicle is not limited to the aforesaid configuration. In the aforesaid embodiment, the driving control unit 46 is adapted to calculate target acceleration and required driving force based on the action plan. However, the action plan generation unit 45 can optionally be adapted to calculate target acceleration or calculate target acceleration and required driving force and output the calculated data by including them in the associated action plan. Therefore, data output as the action plan is not limited to those set out in the foregoing.

Although, in the aforesaid embodiment, the engine 1 is used as the propulsion power source of the self-driving vehicle, use of a propulsion motor (electric motor) is also possible. In such case, it suffices to configure a driving control unit to control the propulsion motor and transmission so that the self-driving vehicle travels by self-driving in accordance with the action plan. Although the aforesaid embodiment is explained with respect to an example using a stepped transmission, the present invention can be similarly applied in the case of using a continuously variable transmission.

Although, in the vehicle control apparatus 100 according to the aforesaid embodiment, the processing unit 41 is adapted to perform both the processing of FIG. 8 and the processing of FIG. 16, it can optionally be adapted to perform only one of them. In other words, the vehicle control apparatus 100 can be configured without capability to perform the first shift processing, second shift processing and third shift processing of FIG. 8, or configured without capability to perform processing of action plan hindrance of FIG. 16. The processing unit 41 can be adapted to perform not all of the first shift processing, second shift processing and third shift processing of FIG. 8 but to perform only one of them (e.g., first shift processing) or two of them (e.g., first shift processing and second shift processing or first shift processing and third shift processing).

The present invention can also be used as a vehicle control method for a self-driving vehicle with a self-drive function including a drive power source and a transmission installed in a power transmission path from the drive power source to drive wheels.

The above embodiment can be combined as desired with one or more of the above modifications. The modifications can also be combined with one another.

According to the present invention, it is possible to smoothly accelerate a self-driving vehicle and obtain a ride comfort.

Above, while the present invention has been described with reference to the preferred embodiments thereof, it will be understood, by those skilled in the art, that various changes and modifications may be made thereto without departing from the scope of the appended claims.

What is claimed is:

1. A vehicle control apparatus for controlling a self-driving vehicle with a self-drive function including a drive power source, drive wheels, and a transmission installed in a power transmission path from the drive power source to the drive wheels, comprising:
   an electric control unit including a microprocessor and a memory connected to the microprocessor,
   wherein the microprocessor is configured to perform:
      generating an action plan of the self-driving vehicle, the action plan including target position data of the self-driving vehicle set every a unit time within a predetermined time period of a present time; and
      controlling the drive power source and the transmission so that the self-driving vehicle travels by self-driving in accordance with the action plan generated,
   wherein the action plan includes a target vehicle speed defined as a vehicle speed after continuously increasing or decreasing beyond the unit time and a target time defined as a time period from the present time to a time when the target vehicle speed is achieved, and
   wherein the controlling includes controlling the drive power source and the transmission so that the self-driving vehicle travels at a target vehicle acceleration set based on the target time and a vehicle speed change amount from the vehicle speed at the present time to the target vehicle speed.

2. The apparatus according to claim 1, wherein
the microprocessor is configured to perform
   the controlling including controlling the transmission to a transmission speed ratio corresponding to the target vehicle acceleration when a vehicle acceleration at the present time increases, and thereafter keeping the transmission speed ratio constant while controlling the drive power source to accelerate the self-driving vehicle toward the target vehicle speed.

3. The apparatus according to claim 2, wherein
the transmission is a stepped transmission configured so as to stepwisely change the transmission speed ratio, and
the microprocessor is configured to perform
   determining whether a time period required to a completion of a deceleration is longer than or equal to a predetermined time period, when downshifting the transmission to a predetermined speed stage in preparation for an acceleration immediately after the deceleration in accordance with the action plan, and
   the controlling including downshifting the transmission stage by stage when it is determined that the time period required is longer than or equal to the predetermined time period, while downshifting the transmission by skip shifting when it is determined that the time period required is shorter than the predetermined time.

4. The apparatus according to claim 2, wherein
the target vehicle acceleration based on the target time and the vehicle speed change amount is a first vehicle acceleration, and
the microprocessor is configured to perform
calculating a required driving force in accordance with the first vehicle acceleration when the vehicle acceleration at the present time increases, while calculating the required driving force in accordance with a second vehicle acceleration based on the unit time and the vehicle speed change amount every the unit time when the vehicle acceleration at the present time does not increase, and
the controlling including downshifting the transmission when an operating point corresponding to the vehicle speed and the required driving acceleration at the present time crosses a predetermined downshift curve, while upshifting the transmission when a corrected operating point obtained by adding a predetermined excess driving force to the operating point crosses a predetermined upshift curve.

5. The apparatus according to claim 4, wherein
the microprocessor is configured to perform
determining whether the self-driving vehicle transits to a cruise travel state where the first vehicle acceleration decreases toward 0 based on vehicle speed data included in the action plan generated every the unit time within the predetermined time period of the present time, and
setting the predetermined excess driving force to 0 when it is determined that the self-driving vehicle transits to the cruise travel state.

6. The apparatus according to claim 5, wherein
the microprocessor is configured to perform
the determining including determining whether the self-driving vehicle transits to the cruise travel state when the vehicle acceleration at the present time decreases.

7. A vehicle control apparatus for controlling a self-driving vehicle with a self-drive function including a drive power source, drive wheels, and a transmission installed in a power transmission path from the drive power source to the drive wheels, comprising:
an action plan generation unit configured to generate an action plan of the self-driving vehicle, the action plan including target position data of the self-driving vehicle set every a unit time within a predetermined time period of a present time; and
a driving control unit configured to control the drive power source and the transmission so that the self-driving vehicle travels by self-driving in accordance with the action plan generated by the action plan generation unit, wherein
the action plan includes a target vehicle speed defined as a vehicle speed after continuously increasing or decreasing beyond the unit time and a target time defined as a time period from the present time to a time when the target vehicle speed is achieved, and
the driving control unit is configured to control the drive power source and the transmission so that the self-driving vehicle travels at a target vehicle acceleration set based on the target time and a vehicle speed change amount from the vehicle speed at the present time to the target vehicle speed.

8. The apparatus according to claim 7, wherein
the driving control unit is further configured to control the transmission to a transmission speed ratio corresponding to the target vehicle acceleration when a vehicle acceleration at the present time increases, and thereafter to keep the transmission speed ratio constant while controlling the drive power source to accelerate the self-driving vehicle toward the target vehicle speed.

9. The apparatus according to claim 8, wherein
the transmission is a stepped transmission configured so as to stepwisely change the transmission speed ratio, and
when downshifting the transmission to a predetermined speed stage in preparation for an acceleration immediately after a deceleration in accordance with the action plan, the driving control unit is further configured to determine whether a time period required to a completion of the deceleration is longer than or equal to a predetermined time period, and to downshift the transmission stage by stage when determining that the time period required is longer than or equal to the predetermined time period, while to downshift the transmission by skip shifting when determining that the time period required is shorter than the predetermined time.

10. The apparatus according to claim 8, wherein
the target vehicle acceleration based on the target time and the vehicle speed change amount is a first vehicle acceleration, and
the driving control unit is further configured to calculate a required driving force in accordance with the first vehicle acceleration when the vehicle acceleration at the present time increases, while to calculate the required driving force in accordance with a second vehicle acceleration based on the unit time and the vehicle speed change amount every the unit time when the vehicle acceleration at the present time does not increase, and further to downshift the transmission when an operating point corresponding to the vehicle speed and the required driving acceleration at the present time crosses a predetermined downshift curve, while to upshift the transmission when a corrected operating point obtained by adding a predetermined excess driving force to the operating point crosses a predetermined upshift curve.

11. The apparatus according to claim 10, wherein
the driving control unit is further configured to determine whether the self-driving vehicle transits to a cruise travel state where the first vehicle acceleration decreases toward 0 based on vehicle speed data included in the action plan generated by the action plan generation unit every the unit time within the predetermined time period of the present time, and to set the predetermined excess driving force to 0 when determining that the self-driving vehicle transits to the cruise travel state.

12. The apparatus according to claim 11, wherein
the driving control unit is configured to determine whether the self-driving vehicle transits to the cruise travel state when the vehicle acceleration at the present time decreases.

13. A vehicle control method for controlling a self-driving vehicle with a self-drive function including a drive power source, drive wheels, and a transmission installed in a power transmission path from the drive power source to the drive wheels, comprising:
generating an action plan of the self-driving vehicle, the action plan including target position data of the self-driving vehicle set every a unit time within a predetermined time period of a present time; and controlling the drive power source and the transmission so that the self-driving vehicle travels by self-driving in accordance with the action plan generated, wherein the action plan includes a target vehicle speed defined as a vehicle speed after continuously increasing or decreasing beyond the unit time and a target time defined as a time period from the present time to a time when the target vehicle speed is achieved, and the controlling includes controlling the drive power source and the transmission so that the self-driving vehicle travels at a target vehicle acceleration set based on the target time and a vehicle speed change amount from the vehicle speed at the present time to the target vehicle speed.

14. The method according to claim 13, wherein
the controlling includes controlling the transmission to a transmission speed ratio corresponding to the target vehicle acceleration when a vehicle acceleration at the present time increases, and thereafter keeping the transmission speed ratio constant while controlling the drive power source to accelerate the self-driving vehicle toward the target vehicle speed.

15. The method according to claim 14, wherein
the transmission is a stepped transmission configured so as to stepwisely change the transmission speed ratio,
the method further comprises determining whether a time period required to a completion of a deceleration is longer than or equal to a predetermined time period, when downshifting the transmission to a predetermined speed stage in preparation for an acceleration immediately after the deceleration in accordance with the action plan, and
the controlling includes downshifting the transmission stage by stage when it is determined that the time period required is longer than or equal to the predetermined time period, while downshifting the transmission by skip shifting when it is determined that the time period required is shorter than the predetermined time.

16. The method according to claim 14, wherein
the target vehicle acceleration based on the target time and the vehicle speed change amount is a first vehicle acceleration,
the method further comprises calculating a required driving force in accordance with the first vehicle acceleration when the vehicle acceleration at the present time increases, while calculating the required driving force in accordance with a second vehicle acceleration based on the unit time and the vehicle speed change amount every the unit time when the vehicle acceleration at the present time does not increase, and
the controlling includes downshifting the transmission when an operating point corresponding to the vehicle speed and the required driving acceleration at the present time crosses a predetermined downshift curve, while upshifting the transmission when a corrected operating point obtained by adding a predetermined excess driving force to the operating point crosses a predetermined upshift curve.

17. The method according to claim 16, further comprising:
determining whether the self-driving vehicle transits to a cruise travel state where the first vehicle acceleration decreases toward 0 based on vehicle speed data included in the action plan generated every the unit time within the predetermined time period of the present time, and
setting the predetermined excess driving force to 0 when it is determined that the self-driving vehicle transits to the cruise travel state.

18. The method according to claim 17, wherein
the determining includes determining whether the self-driving vehicle transits to the cruise travel state when the vehicle acceleration at the present time decreases.

* * * * *